(12) United States Patent
Alelyani et al.

(10) Patent No.: US 11,029,064 B2
(45) Date of Patent: Jun. 8, 2021

(54) SOLAR ADSORPTION HEAT PUMP AND EVACUATED TUBE ADSORPTION HEAT PUMP AND DESALINATION SYSTEM

(71) Applicants: Sami Alelyani, Tempe, AZ (US); Patrick Phelan, Arlington, VA (US); Shahnawaz Sinha, Chandler, AZ (US)

(72) Inventors: Sami Alelyani, Tempe, AZ (US); Patrick Phelan, Arlington, VA (US); Shahnawaz Sinha, Chandler, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 52 days.

(21) Appl. No.: 16/379,644

(22) Filed: Apr. 9, 2019

(65) Prior Publication Data

US 2019/0309998 A1 Oct. 10, 2019

Related U.S. Application Data

(60) Provisional application No. 62/654,935, filed on Apr. 9, 2018.

(51) Int. Cl.
*F25B 27/00* (2006.01)
*F25B 17/08* (2006.01)
(Continued)

(52) U.S. Cl.
CPC ............ *F25B 27/007* (2013.01); *F25B 17/08* (2013.01); *F25B 30/04* (2013.01); *F24S 10/45* (2018.05); *F24S 80/54* (2018.05); *F25B 29/006* (2013.01)

(58) Field of Classification Search
CPC ........ F25B 27/007; F25B 17/08; F25B 30/04; F25B 29/006; F25B 35/04; F25B 17/086;
(Continued)

(56) References Cited

U.S. PATENT DOCUMENTS 4,135,371 A * 1/1979 Kesselring ............ F28D 20/003
62/477
4,231,772 A * 11/1980 Berg ........................ F25B 30/04
62/235.1
(Continued)

FOREIGN PATENT DOCUMENTS

AU 2011201748 A1 * 11/2012
AU 12011201748 A1 * 11/2012
(Continued)

OTHER PUBLICATIONS

Abdulrahim et al., "Thermal Desalination and Air Conditioning using Absorption Cycle," Desalination and Water Treatment, 2015, 55(12) pp. 3310-3329.
(Continued)

*Primary Examiner* — Emmanuel E Duke
(74) *Attorney, Agent, or Firm* — Michael Best & Friedrich LLP

(57) ABSTRACT

A system includes an evacuated tube solar adsorption heat pump (ETSAHP) module. The ETSAHP module includes a transparent or semi-transparent tube configured to receive heat input from solar energy, the tube having a hollow interior, a top section, and a bottom section opposite the top section, an adsorbent bed comprising a plurality of adsorbent beads and positioned at the top section of the tube and configured to absorb solar energy, an adsorbent bed cage configured to contain the adsorbent bed at the top section of the tube, a threshold configured to stabilize the adsorbent container within the tube, and a condenser/evaporator positioned at the bottom section of the tube and spaced apart from the adsorbent bed.

15 Claims, 21 Drawing Sheets

(51) Int. Cl.
F25B 30/04 (2006.01)
F25B 29/00 (2006.01)
F24S 10/40 (2018.01)
F24S 80/54 (2018.01)

(58) Field of Classification Search
CPC ......... F25B 49/046; F24S 10/70; F24S 10/45;
F24S 80/54; F24S 23/74; F24S 70/225;
Y02A 20/142; Y02A 30/27; Y02B 30/62;
Y02B 30/00; B60H 1/3201
See application file for complete search history.

(56) References Cited

U.S. PATENT DOCUMENTS

| | | | | |
|---|---|---|---|---|
| 4,291,676 | A * | 9/1981 | Asselman | F24S 10/95 126/636 |
| 4,586,345 | A * | 5/1986 | Friberg | F25B 17/08 62/235.1 |
| 10,162,394 | B2 | 12/2018 | Wu et al. | |
| 2002/0005271 | A1* | 1/2002 | Weiss | F24F 5/0014 165/61 |
| 2010/0292524 | A1* | 11/2010 | Turner | C10L 3/08 585/802 |
| 2011/0272356 | A1* | 11/2011 | Hoffmann | G01N 30/6039 210/656 |
| 2013/0313198 | A1* | 11/2013 | Giese | B01J 20/00 210/660 |
| 2016/0290696 | A1* | 10/2016 | Barot | B60H 1/32014 |

FOREIGN PATENT DOCUMENTS

EP         1629879 A1 *  3/2006
WO   WO 2017112875 A1    6/2017

OTHER PUBLICATIONS

Adewusi et al., "Second Law Based Thermodynamic Analysis of Ammonia—water Absorption Systems," Energy Conversion and Management, 2004, 45(15) pp. 2355-2369.
Afonso et al., "Characterization of Equilibrium Conditions of Adsorbed Silica Gel/Water Bed According to Dubinin Astakhov and Freundlich," Revista De Engenharia Térmica, 4(1), 2005.
Akbari et al., "Energy and Exergy Analyses of a New Combined Cycle for Producing Electricity and Desalinated Water using Geothermal Energy," Sustainability, 6(4), 2014, pp. 1796-1820.
Al Moussawi et al., "Review of Tri-Generation Technologies: Design Evaluation, Optimization, Decision-Making, and Selection Approach," Energy Conversion and Management, 120, 2016, pp. 157-196.
Al-Alili et al., "Review of Solar Thermal Air Conditioning Technologies," International Journal of Refrigeration, 2014, 39 pp. 4-22.
Alarcón-Padilla et al., "Application of Absorption Heat Pumps to Multi-Effect Distillation: A Case Study of Solar Desalination," Desalination, 212(1), 2007, pp. 294-302.
Alasfour et al., "The Feasibility of Integrating ME-TVC MEE with Azzour South Power Plant: Economic Evaluation," Desalination, 2006, 197(1-3) pp. 33-49.
Alelyani et al., "Assessment of a Novel Heat-Driven Cycle to Produce Shaft Power and Refrigeration," Applied Energy, 2018, 215 pp. 751-764.
Alelyani et al., "Techno-Economic Analysis of Combined Ammonia-Water Absorption Refrigeration and Desalination," Energy Conversion and Management, 143, 2017 pp. 493-504.
Al-Karaghouli et al., "Energy Consumption and Water Production Cost of Conventional and Renewable-Energy-Powered Desalination Processes," Renewable and Sustainable Energy Reviews, 2013, 24pp. 343-356.
Aly, "A Study of a New Thermal Vapor Compression/Multi-Effect Stack (TVC/MES) Low Temperature Distillation System," Desalination, 103(3), 1995, pp. 257-263.

Ameri et al., "Performance Assessment and Multi-Objective Optimization of an Integrated Organic Rankine Cycle and Multi-Effect Desalination System," Desalination, 2016, 392 pp. 34-45.
Anvari et al., "Thermo-Economical Consideration of Regenerative Organic Rankine Cycle Coupling with the Absorption Chiller Systems Incorporated in the Trigeneration System," Energy Conversion and Management, 2017, 148pp. 317-329.
Bau et al., "Dynamic Optimisation of Adsorber-Bed Designs Ensuring Optimal Control," Applied Thermal Engineering, 2017, 125 pp. 1565-1576.
Calise, et al., 2016, Simulation of Polygeneration Systems.
Camacho et al., "Control for Renewable Energy and Smart Grids," The Impact of Control Technology, Control Systems Society, 2011, pp. 69-88.
Cavenati et al., "Adsorption Equilibrium of Methane, Carbon Dioxide, and Nitrogen on Zeolite 13X at High Pressures," Journal of Chemical & Engineering Data, 49(4), 2004, pp. 1095-1101.
Chihara et al., "Air Drying by Pressure Swing Adsorption," Journal of Chemical Engineering of Japan, 16(4), 1983, pp. 293-299.
Cho et al., "Combined Cooling, Heating and Power: A Review of Performance Improvement and Optimization," Applied Energy, 136, 2014, pp. 168-185.
Cho, "Modeling of a Silica Gel/Water Adsorption-Cooling System," Energy, 17(9), 1992, pp. 829-839.
Conde, "Properties of Aqueous Solutions of Lithium and Calcium Chlorides: Formulations for use in Air Conditioning Equipment Design," International Journal of Thermal Sciences, 43(4), 2004, pp. 367-382.
Critoph, "Continuous multiple-bed regenerative adsorption cycle refrigerator/heat pump," Proc. IY Minsk Internat. Seminar on Heat pipes, heat pumps, refrigerators. 2000, pp. 77.
Critoph, "Multiple Bed Regenerative Adsorption Cycle using the Monolithic Carbon-ammonia Pair," Applied Thermal Engineering, 22(6), 2002, pp. 667-677.
Critoph, "Simulation of a Continuous Multiple-Bed Regenerative Adsorption Cycle," International Journal of Refrigeration, 24(5), 2001, pp. 428-437.
Dai, "Increasing Drought Under Global Warming in Observations and Models," Nature Climate Change, 3(1), 2013, pp. 52-58.
Darwish et al., "Retrofitting the Combined-Cycle Producing Electric Power and Desalted Seawater to Include District Cooling in GCC," Desalination and Water Treatment, 2016, 57(12) pp. 5331-5344.
Demir et al., "A Review on Adsorption Heat Pump: Problems and Solutions," Renewable and Sustainable Energy Reviews, 12(9), 2008, pp. 2381-2403.
Demirkaya et al, "A Review of Combined Power and Cooling Cycles," Wiley Interdisciplinary Reviews: Energy and Environment, 2(5), 2013, pp. 534-547.
Deng et al., "A Review of Thermally Activated Cooling Technologies for Combined Cooling, Heating and Power Systems," Progress in Energy and Combustion Science, 2011, 37(2) pp. 172-203.
Doe, "Waste Heat Recovery: Techonology and Opportunities in US Industry," Washington DC: US Department of Energy Industrial Technologies Program, 2008.
Eia, U., 2011, "International Energy Outlook," US Energy Information Administration, Washington, DC.
Elimelech et al., "The Future of Seawater Desalination: Energy, Technology, and the Environment," Science, 2011, 333(6043) pp. 712-717.
Elsonet al., "Waste Heat to Power Market Assessment," Oak Ridge National Laboratory, 2015.
Esfahani et al., "A High Efficient Combined Multi-Effect Evaporation—absorption Heat Pump and Vapor-Compression Refrigeration Part 1: Energy and Economic Modeling and Analysis," Energy, 2014, 75pp. 312-326.
Esfahani et al., "Modeling and Genetic Algorithm-Based Multi-Objective Optimization of the MED-TVC Desalination System," Desalination, 2012, 292 pp. 87-104.
Ettouney, "Seawater Desalination," Springer, 2009, pp. 17-40.
Farshi et al., "Exergoeconomic Comparison of Double Effect and Combined Ejector-Double Effect Absorption Refrigeration Systems," Applied Energy, 103, 2013, pp. 700-711.

(56) References Cited

OTHER PUBLICATIONS

Fernandes et al., "Review and Future Trends of Solar Adsorption Refrigeration Systems," Renewable and Sustainable Energy Reviews, 2014, 39 pp. 102-123.

Ferrari et al., "Smart Polygeneration Grids: Experimental Performance Curves of Different Prime Movers," Applied Energy, 162, 2016, pp. 622-630.

Foo et al., "Insights into the Modeling of Adsorption Isotherm Systems," Chemical Engineering Journal, 156(1), 2010, pp. 2-10.

Fumo et al., "Emission Operational Strategy for Combined Cooling, Heating, and Power Systems," Applied Energy, 86(11), 2009, pp. 2344-2350.

Gandhidasan, "A Simplified Model for Air Dehumidification with Liquid Desiccant," Solar Energy, 76(4), 2004, pp. 409-416.

Gandhidasan, "Quick Performance Prediction of Liquid Desiccant Regeneration in a Packed Bed," Solar Energy, 79(1), 2005, pp. 47-55.

Gebreslassie et al., "Multi-Objective Optimization of Sustainable Single-Effect Water/Lithium Bromide Absorption Cycle," Renewable Energy, 2012, 46 pp. 100-110.

Goetzler et al., "The Future of Air Conditioning for Buildings," US Department of Energy, Energy Efficiency & Renewable Energy, Building Technologies Office, 2016.

Gomri, "Thermal Seawater Desalination: Possibilities of using Single Effect and Double Effect Absorption Heat Transformer Systems," Desalination, 253(1), 2010, pp. 112-118.

Gude et al., "Combined Desalination and Solar-Assisted Air-Conditioning System," Energy Conversion and Management, 49(11), 2008, pp. 3326-3330.

Gupta et al, "Comparative Analysis of Thermally Activated, Environmentally Friendly Cooling Systems," Energy Conversion and Management, 49(5), 2008, pp. 1091-1097.

Han et al., "Assessment of Off-Design Performance of a Small-Scale Combined Cooling and Power System using an Alternative Operating Strategy for Gas Turbine," Applied Energy, 138, 2015, pp. 160-168.

Hatzikioseyian et al., "Modelling and Thermodynamic Analysis of a Multi Effect Distillation (MED) Plant for Seawater Desalination," National Technical University of Athens (NTUA), 2003, Greece.

Haywood et al., "Thermodynamic Feasibility of Harvesting Data Center Waste Heat to Drive an Absorption Chiller," Energy Conversion and Management, 2012, 58 pp. 26-34.

Ho, "Review of Second-Order Models for Adsorption Systems," Journal of Hazardous Materials, 136(3), 2006, pp. 681-689.

Jafarkazemi et al., "Evacuated Tube Solar Heat Pipe Collector Model and Associated Tests," Journal of Renewable and Sustainable Energy, 4(2), 2012, pp. 023101.

Jana et al., "Polygeneration as a Future Sustainable Energy solution—A Comprehensive Review," Applied Energy, 202, 2017, pp. 88-111.

Jana, "Advances in Heat Pump Assisted Distillation Column: A Review," Energy Conversion and Management, 2014, 77pp. 287-297.

Kahraman et al., "Exergy Analysis of a MSF Distillation Plant," Energy Conversion and Management, 46(15), 2005, pp. 2625-2636.

Kang et al., "A New Utilization Approach of the Waste Heat with Mid-Low Temperature in the Combined Heating and Power System Integrating Heat Pump," Applied Energy, 160, 2015, pp. 185-193.

Khalil et al., "Ejector Design and Theoretical Study of R134a Ejector Refrigeration Cycle," International Journal of Refrigeration, 34(7), 2011, pp. 1684-1698.

Klein et al., "EES: Engineering equation solver for the Microsoft Windows operating system," 1992, F-Chart Software.

Li et al., "Optimal Design and Analysis of a New CHP-HP Integrated System," Energy Conversion and Management, 146, 2017, pp. 217-227.

Li et al., "Optimization Study of Distillation Column Based on Type I Absorption Heat Pump," Applied Thermal Engineering, 2017.

Li et al., "Techno-Economic Feasibility of Absorption Heat Pumps using Wastewater as the Heating Source for Desalination," Desalination, 2011, 281pp. 118-127.

Liu et al., "Combined Cooling, Heating and Power Systems: A Survey," Renewable and Sustainable Energy Reviews, 35, 2014, pp. 1-22.

McMullan, "Refrigeration and the Environment—issues and Strategies for the Future," International Journal of Refrigeration, 25(1), 2002, pp. 89-99.

Mistry et al., "Entropy Generation Analysis of Desalination Technologies," Entropy, 13(10), 2011, pp. 1829-1864.

Mohamed et al., "Performance Evaluation of Gauze Packing for Liquid Desiccant Dehumidification System," Case Studies in Thermal Engineering, 8, 2016, pp. 260-276.

Mohan et al., "Development of Natural Gas Fired Combined Cycle Plant for Tri-Generation of Power, Cooling and Clean Water using Waste Heat Recovery: Techno-Economic Analysis," Energies, 7(10), 2014, pp. 6358-6381.

Mohanraj et al., "Environment Friendly Alternatives to Halogenated refrigerants—A Review," International Journal of Greenhouse Gas Control, 2009, 3(1) pp. 108-119.

Murugan et al., "Tri and Polygeneration Systems—A Review," Renewable and Sustainable Energy Reviews, 2016, 60 pp. 1032-1051.

Negewo, "Renewable energy desalination: an emerging solution to close the water gap in the Middle East and North Africa," World Bank Publications, 2012.

Ng et al., "Adsorption Desalination: An Emerging Low-Cost Thermal Desalination Method," Desalination, 2013, 308 pp. 161-179.

Ortega-Delgado et al., "Parametric Study of a Multi-Effect Distillation Plant with Thermal Vapor Compression for its Integration into a Rankine Cycle Power Block," Desalination, 2016, 394 pp. 18-29.

Otanicar et al., "Prospects for Solar cooling—An Economic and Environmental Assessment," Solar Energy, 86(5), 2012, pp. 1287-1299.

Paradis et al., "Thermal Modeling of Evacuated Tube Solar Air Collectors," Solar Energy, 2015, 115 pp. 708-721.

Quoilin et al., "Techno-Economic Survey of Organic Rankine Cycle (ORC) Systems," Renewable and Sustainable Energy Reviews, 2013, 22 pp. 168-186.

Rafique et al., "Parametric Analysis of a Rotary Type Liquid Desiccant Air Conditioning System," Energies, 9(4), 2016, pp. 305.

Ratzel et al., "Techniques for Reducing Thermal Conduction and Natural Convection Heat Losses in Annular Receiver Geometries," Journal of Heat Transfer, 101(1), 1979, pp. 108-113.

Rosen et al., "Efficiency Measures for Processes Integrating Combined Heat and Power and District Cooling," Thermodynamics and the Design, Analysis, and Improvement of Energy Systems, 35, 1995, pp. 423-434.

Rostamzadeh et al., "Energy and Exergy Analysis of Novel Combined Cooling and Power (CCP) Cycles," Applied Thermal Engineering, 2017.

Sadineni et al., "Impact of Roof Integrated PV Orientation on the Residential Electricity Peak Demand," Applied Energy, 2012, 92 pp. 204-210.

Sah et al., "A Review on Adsorption Cooling Systems with Silica Gel and Carbon as Adsorbents," Renewable and Sustainable Energy Reviews, 2015, 45 pp. 123-134.

Sah et al., "A Review on Low Grade Heat Powered Adsorption Cooling Systems for Ice Production," Renewable and Sustainable Energy Reviews, 2016, 62 pp. 109-120.

Sahoo et al., "Scope and Sustainability of Hybrid Solar-biomass Power Plant with Cooling, Desalination in Polygeneration Process in India," Renewable and Sustainable Energy Reviews, 2015, 51 pp. 304-316.

Salimi et al., "Investigating the Integration of Desalination Units into Cogeneration Systems Utilizing R-Curve Tool," Desalination, 2017, 419 pp. 49-59.

Schawe, "Theoretical and Experimental Investigations of an Adsorption Heat Pump with Heat Transfer between Two Adsorbers", 2001.

(56) References Cited

OTHER PUBLICATIONS

Schliephake et al., "Overview of Treatment Processes for the Production of Fit for Purpose Water: Desalination and Membrane Technologies, ASIRC Report No." R05-2207.Australian Sustainable Industry Research Centre Ltd., 2005, Churchill.

Shafii et al., "A Modified Solar Desalination System using Evacuated Tube Collector," Desalination, 2016, 396 pp. 30-38.

Sharqawy et al., "Thermophysical Properties of Seawater: A Review of Existing Correlations and Data," Desalination and Water Treatment, 16(1-3), 2010, pp. 354-380.

Tamainot-Telto et al., "Advanced Solid Sorption Air Conditioning Modules using Monolithic Carbon-ammonia Pair," Applied Thermal Engineering, 23(6), 2003, pp. 659-674.

Tamainot-Telto et al., "Monolithic Carbon for Sorption Refrigeration and Heat Pump Applications," Applied Thermal Engineering, 21(1), 2001, pp. 37-52.

Varga et al., "Analysis of a Solar-Assisted Ejector Cooling System for Air Conditioning," International Journal of Low-Carbon Technologies, 2009.

Verdier, 2011, "MENA Regional Water Outlook Part II Desalination using Renewable Energy Task 1—Desalination Potential".

Vetter et al., "Comparison of Sub-and Supercritical Organic Rankine Cycles for Power Generation from Low-Temperature/Low-Enthalpy Geothermal Wells, Considering Specific Net Power Output and Efficiency," Applied Thermal Engineering, 51(1), 2013, pp. 871-879.

Wang et al., "Adsorption Equilibrium of Carbon Dioxide and Water Vapor on Zeolites 5A and 13X and Silica Gel: Pure Components," Journal of Chemical & Engineering Data, 54(10), 2009, pp. 2839-2844.

Wang et al., "Proposal and Analysis of a High-Efficiency Combined Desalination and Refrigeration System Based on the LiBr—$H_2O$ Absorption Cycle—part 1: 180 System Configuration and Mathematical Model," Energy Conversion and Management, 2011, 52(1) pp. 220-227.

Wang et al., "Proposal and Analysis of a High-Efficiency Combined Desalination and Refrigeration System Based on the LiBr—$H_2O$ Absorption cycle—Part 2: Thermal Performance Analysis and Discussions," Energy Conversion and Management, 52(1), 2011, pp. 228-235.

Younes, M. M., Ei-Sharkawy, I. I., Kabeel, A., 2017, "A Review on Adsorbent-Adsorbate Pairs for Cooling Applications," Applied Thermal Engineering, 114pp. 394-414.

* cited by examiner

SOLAR ADSORPTION HEAT PUMP AND EVACUATED TUBE ADSORPTION HEAT PUMP AND DESALINATION SYSTEM

CROSS-REFERENCE TO RELATED APPLICATIONS

This application is a non-provisional of and claims the benefit of U.S. Provisional Application No. 62/654,935, filed on Apr. 9, 2018, the contents of which are incorporated herein by reference.

FIELD OF THE INVENTION

This disclosure generally relates to the field of thermodynamics, energy conversion, refrigeration and air conditioning, and more particularly, to evacuated tube solar adsorption heat pump and desalination, which is based on the adsorption refrigeration cycle.

BACKGROUND

Non-concentrated solar thermal energy systems have struggled to be extensively deployed, especially in hot climate areas where they are mainly used for space heating and domestic hot water. Cooling demand increases as the solar radiation increases which makes it ideal to integrate both systems together. Unlike thermally driven absorption heat pump systems, adsorption heat pump systems can be relatively cheap to manufacture, and can be operated using low-grade heat, which is suitable for small residential scale. Typical cooling and refrigeration systems based on the conventional vapor compression cycle are not only responsible for the major energy (electricity) consumption in the residential and commercial buildings during summer, but also for the annual electricity peak demand which costs the utility companies billions of dollars to cover just a few hours per year. Furthermore, conventional cooling systems use refrigerants that are responsible for the depletion of the ozone layer and global warming. Some of these refrigerants have been prohibited and phased out, while the others are limited, and are expected to be phased out in the near future.

There is an enormous commercial potential to provide an alternative cooling system that is inexpensive, uses natural/environmentally friendly refrigerant that harnesses low-grade solar energy, and acts as a thermal cooling storage. Evacuated tube and compound parabolic concentrator solar thermal collectors have not become widely adopted due to relatively high temperatures and long payback when used for hot water. These alternative heat pump systems could act as thermal cooling storage, and play a part in shaping and controlling the peak demand resulting in a large savings for the electrical utility companies. The return on investment of such system is anticipated to be much higher than typical evacuated tube solar collector systems since the cooling product is more valuable than the hot water product. The systems can possibly provide hot water in addition to cooling (refrigeration), can easily be scalable, potentially much cheaper, and capable of holding and maintaining high vacuum with no leak problems.

Further, there is demand to use solar thermal energy to assist in the desalination process, which will reduce the levelized cost of water through reducing the levelized cost of heat, increasing the energy efficiency for thermal desalination processes, and reducing the overall capital and integration costs for solar thermal desalination. Applications for thermal desalination include municipality water production, agriculture, industrial processes, and purification of water produced from various industrial processes, including oil and gas extraction. Thermal desalination, in general, has particular application for water with high total dissolved salt content or for applications that require zero liquid discharge.

SUMMARY

In one embodiment, a system comprises an evacuated tube solar adsorption heat pump (ETSAHP) module. The module includes a transparent or semi-transparent tube configured to receive heat input from solar energy, the tube having a hollow interior, a top section, and a bottom section opposite the top section, an adsorbent bed comprising a plurality of adsorbent beads and positioned at the top section of the tube and configured to absorb solar energy, an adsorbent bed cage configured to contain the adsorbent bed at the top section of the tube, a threshold configured to stabilize the adsorbent container within the tube, and a condenser/evaporator positioned at the bottom section of the tube and spaced apart from the adsorbent bed.

In another embodiment, a system comprises an evacuated tube adsorption heat pump and desalination (ETAHP&D) module. The module comprises a tube configured to receive heat input from solar energy, the tube having a hollow interior, an adsorbent located within the tube, an adsorbent bed cage located within the tube and defining a storage volume containing the adsorbent, a threshold configured to stabilize the adsorbent bed cage within the tube, and a condenser/evaporator positioned within the interior of the tube and spaced apart from the adsorbent bed cage, a removable cap fastened to the tube.

In yet another embodiment, a system comprises a manifold and a plurality of evacuated tube adsorption heat pump and desalination (ETAHP&D) modules. Each module comprises a tube configured to receive energy from an energy source, an adsorbent located within the tube, an adsorbent bed cage located within the tube and defining a storage volume containing the adsorbent, a threshold configured to stabilize the adsorbent bed cage, a condenser/evaporator positioned within the interior of the tube and spaced apart from the adsorbent bed cage, an insulation at least partially surrounding the condenser/evaporator, a removable cap fastened to the tube, a selective absorber configured to absorb solar energy at the adsorbent bed, and a connector operable to fasten the tube to the manifold.

Some embodiments include a system comprising an evacuated tube solar adsorption heat pump (ETSAHP) module, where the module comprises a single transparent or semitransparent tube configured to receive heat input from solar energy to provide cooling (refrigeration) and heating, a selective absorber or adsorbent bed configured to absorb solar energy on the top section of the tube, and an adsorbent bed cage configured to contain the adsorbent and to act as a heat exchanger to improve heat and mass transfers, and the cage is placed at the top section of the tube. Some embodiments include a threshold configured to keep the adsorbent bed cage stable, and a space between the adsorbent bed (top part) and condenser/evaporator (bottom part) sections configured to minimize the heat transfer between both sections. Some embodiments include a valve or separator configured to enable the module to operate as a thermal cooling storage. Some further embodiments include a heat exchanger at the bottom of the tube (condenser/evaporator section) to enhance to heat transfer between the evaporator and condenser with the external cooling or heating loads, respectively. Some embodiments include an insulation on the bottom section (condenser/evaporator) to prevent absorbing and rejecting heat from and to the surroundings, respectively, instead on the load. Some embodiments include a cap or stopper configured to access components inside the tube module. Some embodiments include a one-way adaptor configured to allow evacuating the tube but not allowing outer air to enter the tube module.

Some embodiments include a selective absorber placed on the outer, inner, and/or middle of the glass tube's wall, or on the outer wall of the adsorbent bed cage. In some further embodiments, the adsorbent bed cage is a closed cage with a mesh wall configured to contain the adsorbent beads and allow the refrigerant vapor to enter and exit the cage at the same time.

In some embodiments, the adsorbent bed cage is removed and replaced with a filter mesh disc placed perpendicular to the tube length to hold the adsorbent beads from falling to the other side of the tube. In some embodiments, the valve or separator is activated magnetically, thermally, electrically, or manually. In other embodiments, the valve or separator is eliminated. In other embodiments, the heat exchanger is eliminated and the tube's wall transfers heat directly. In some further embodiments, the insulation is replaced with twin tube and vacuum between them.

In some embodiments, the cap or stopper and one-way adapter are eliminated and the tube is completely sealed and closed with glass in which internal components are inaccessible. Some embodiments include multiple systems (modules) connected in series forming an evacuated tube solar adsorption heat pump (ETSAHP) array. In some further embodiments, multiple arrays are connected in series and parallel to handle the cooling/heating load. In some embodiments, the multiple modules are connected to one manifold or duct if the external heat transfer fluid is liquid or gas (air), respectively. In some embodiments, the bottom section of the tube (condenser/evaporator) comprises materials with or without a valve, where the materials comprise copper, stainless steel, or polyvinyl chloride. In some other embodiments, the single transparent or semi-transparent tube comprises glass.

In some embodiments, the evacuated tube adsorption heat pump and desalination (ETAHP&D) module is an adsorption heat pump system placed inside an evacuated tube to provide cooling and fresh water. An ETAHP&D module is an evacuated tube with a length of about 180 cm, and an internal diameter of 5.5 cm. One side (top section of the tube) represents the adsorbent bed (generator) and contains the adsorbent, while the other side (bottom section of the tube) represents the condenser/evaporator and contains the salt/fresh water (refrigerant). As the adsorbent bed is exposed to the energy source, the desorption process takes place where the saturated adsorbent gives away fresh water vapor as its temperature increases where fresh water gets condensed in the condenser (condenser/evaporator acts as a condenser in this case). Afterward, the produced fresh water is drained and salt water is then added before putting the ETAHP&D module under vacuum. When the energy source is ceased, the dry adsorbent (in the adsorbent bed) absorbs water vapor during what is called the adsorption process and the cooling effect takes place (condenser/evaporator acts as a condenser in this case). Multiple modules are connected in series through a manifold to form an ETAHP&D array, and several arrays are connected in series and parallel to cover the cooling or water demands. The array system can be run continuously by operating different arrays out of phase in which some arrays provide cooling while the rest are generating fresh water. If solar energy is to be harnessed, the system can be operated intermittently by generating fresh water during the day and cooling during the night in a thermal cooling storage for the load of the succeeding day.

Some embodiments propose a novel design for an adsorption heat pump and desalination module that is simple, easily scalable, potentially inexpensive, able to operate continuously, and capable of holding and maintaining high vacuum with no leak problems during the adsorption process. Manufacturers, developers, and researchers can focus on developing a new adsorbent or adsorbent bed cage (a closed mesh cage that holds the adsorbent and improves the heat and mass transfer of the adsorbent bed) that is efficient and inexpensive. The adsorption heat pump and desalination module forms a flexible long-term foundation for the adsorption heat pump and desalination system, for example, if a new adsorbent was discovered after installing the ETAHP&D system, only the adsorbent bed cage needs to be replaced without replacing anything else in the system. Unlike typical evacuated tube solar collector systems, the return on investment of the ETAHP&D system is expected to be much higher based on the advantageous cooling and fresh water in addition to hot water. The ETAHP&D system provides cooling (refrigeration), fresh water, and may also provide heating.

In some embodiments, the ETAHP&D module is capable of generating fresh water during the desorption process and generating cooling during the adsorption process. The evacuated tube adsorption heat pump and desalination (ETAHP&D) system combines an evacuated tube and a simple adsorption heat pump and desalination system in one system that can provide both fresh water and cooling (refrigeration).

In some embodiments, the evacuated tube adsorption heat pump and desalination (ETAHP&D) module provides an inexpensive cooling/desalination system that utilizes environmentally friendly refrigerant (saltwater) to provide cooling and fresh water. The system is also capable of acting as a thermal cooling storage which can play a part in shaping and controlling the peak demand resulting in a large savings for the electrical utility companies. With that said, there is an enormous commercial potential to provide an alternative cooling system that is inexpensive, uses natural refrigerant, harnesses low-grade solar energy, and acts as a thermal cooling storage.

DETAILED DESCRIPTION

Figure 1:
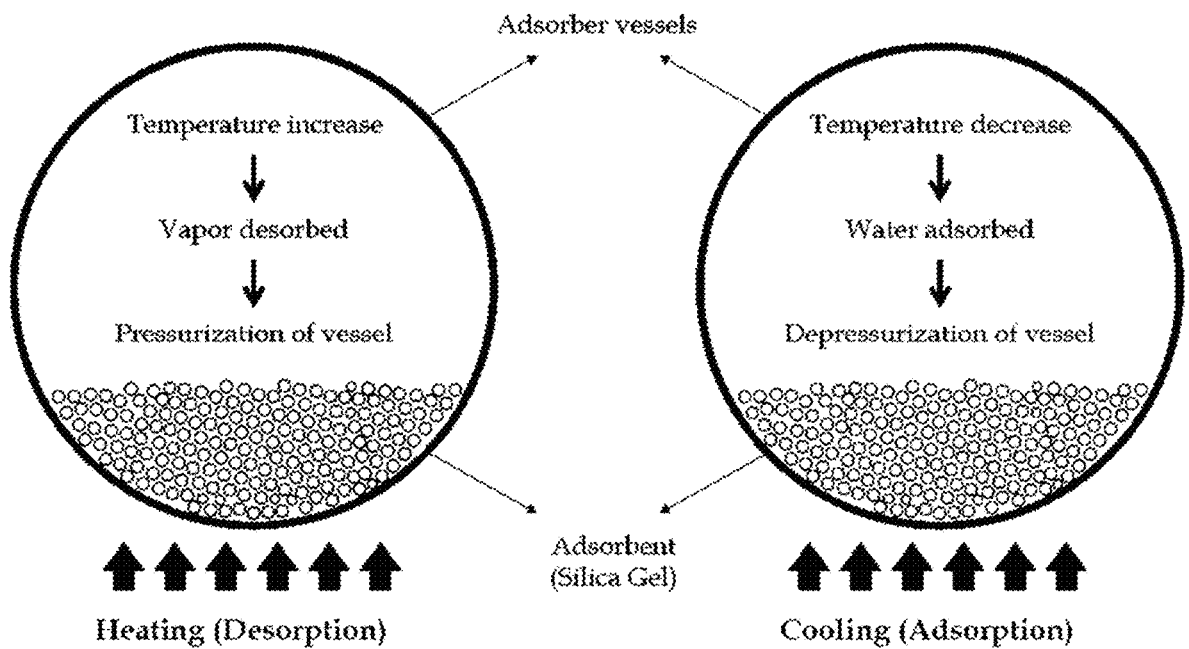
FIG. 1 shows desorption and adsorption processes in a typical heat pump.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Some embodiments include an evacuated tube solar adsorption heat pump (ETSAHP) system that combines an evacuated tube solar collector and an adsorption heat pump system in one system for providing both hot water and cooling (refrigeration). In some embodiments, the system overcomes three major disadvantages namely, maintaining high vacuum, intermittently working principle, and expensive commercial products. In order to overcome the low COP and limited mass and heat transfer, a collective effort by manufacturers, developers, and researchers is required to develop an adsorbent bed cage that is efficient and inexpensive. Due to the relatively small size of the adsorbent bed cage, 3D printing techniques and mass production are very convenient to make such a heat exchanger (adsorbent bed cage).

In some embodiments, the basic adsorption refrigeration cycle consists of four main components: a condenser, an evaporator, an expansion valve, and an adsorbent bed (i.e., adsorber). In some embodiments, the adsorbent bed is a vessel filled with an adsorbent (e.g., silica gel, activated carbon, zeolite, etc.). In other words, in some embodiments, an adsorption heat pump has the same working principle as a mechanical vapor compression cycle, except that the compressor is replaced by a thermal compressor that works according to the phenomenon of adsorption.

FIG. 1 shows desorption and adsorption processes in an adsorption heat pump. The adsorption cooling cycle can be considered as two independent processes, namely, the desorption process and adsorption process which are schematically shown in FIG. 1. In the desorption process, the adsorbent (e.g., silica gel) temperature increases as it is receiving low-grade heat in which the adsorbent tends to desorb vapor refrigerant (e.g., water vapor) that results in increasing the vessel's pressure. This process is also referred to as heating, desorption, and pressurization. During the adsorption process, (and as a result of the reduction in the adsorbent's temperature), the vessel's pressure decreases causing the liquid refrigerant to vaporize. Consequently, the liquid refrigerant's temperature decreases as the adsorbent keeps adsorbing vapor refrigerant.

Figure 2:
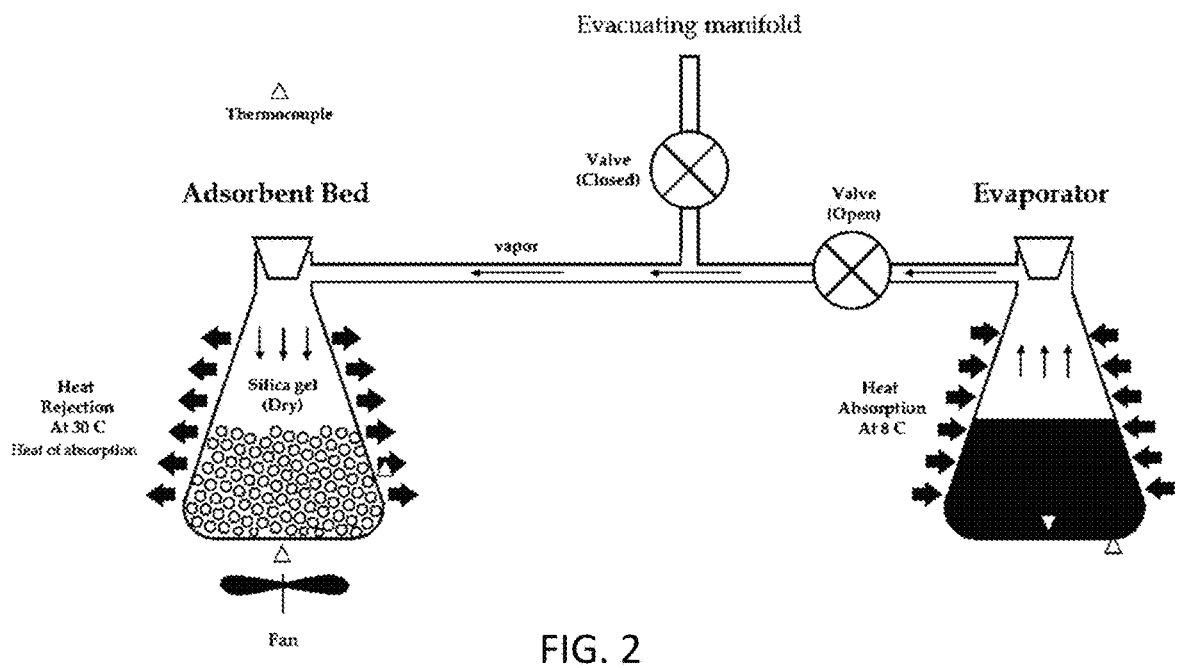
FIG. 2 is a schematic diagram of an experimental setup in accordance with some embodiments.
Figure 3:
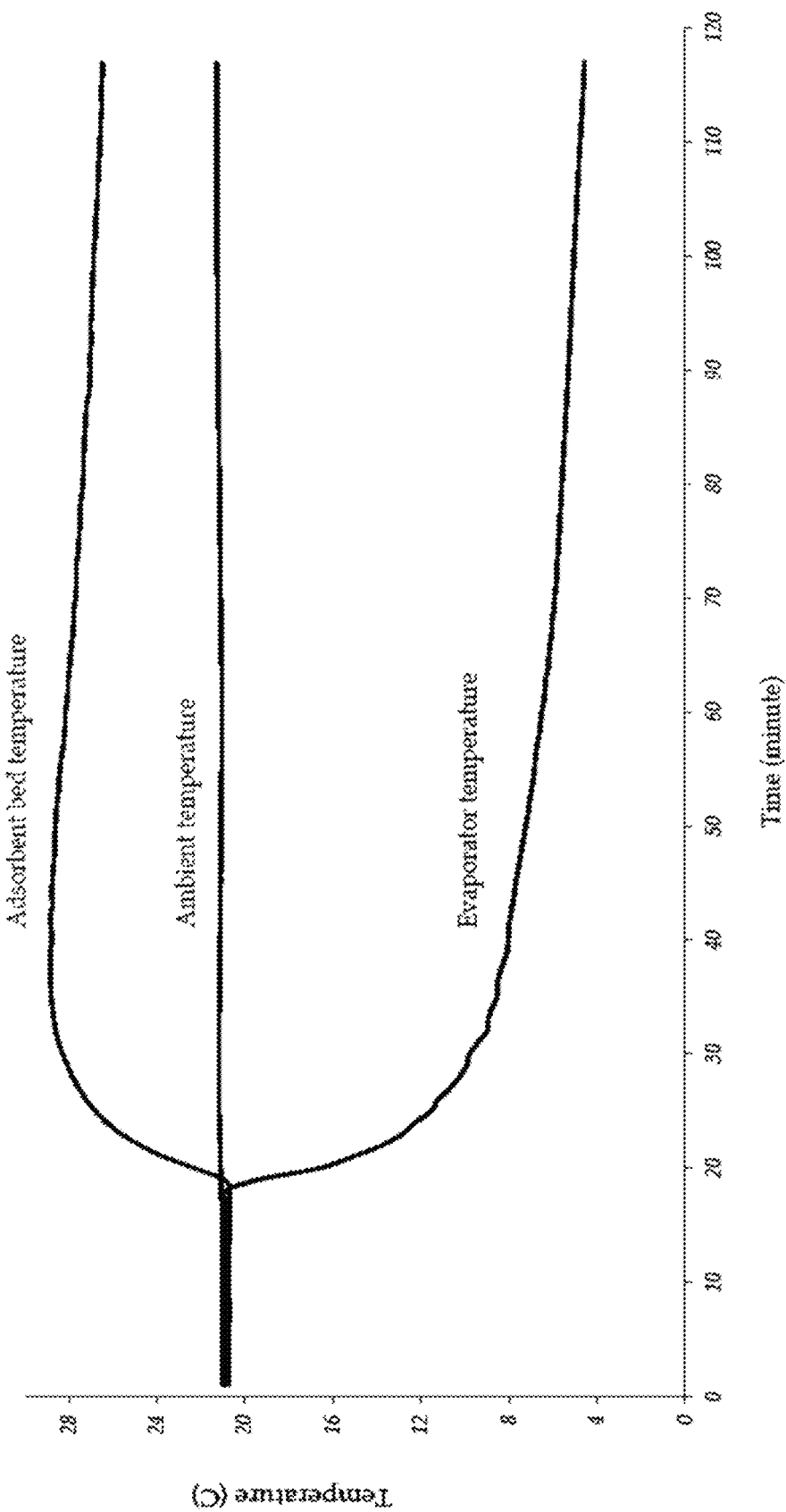
FIG. 3 shows experimental data for the desorption process.

In a proof-of-concept adsorption refrigeration heat pump experiment, two generic lab flasks are used as the adsorbent bed (1000 mL) and the condenser/evaporator (250 mL). Additionally, silica gel and water are used due to their simplicity and availability, and the heat source (hot air at about 100° C.) is provided using a heat gun. Vacuum is achieved using a vacuum pump only at the beginning of the first run, after making sure there was no leakage and the system was completely sealed. A schematic diagram of the experimental setup during the adsorption process is shown in FIG. 2. After opening the valve between the two flasks, the released water vapor starts to be absorbed by the dry silica gel in the adsorbent bed (due to the low pressure in the system). Therefore, the silica gel imparts the heat of adsorption as it absorbs water vapor, and consequently, the liquid water temperature drops in the other flask (note that the flask on the right in FIG. 2 acts as an evaporator in this case), and which is seen clearly in FIG. 3 illustrating experimental data for the desorption process.

In some embodiments, in order to operate the system continuously, multiple adsorbent beds (generators) operating out of phase is used. However, greater numbers of adsorbent beds requires more valves and fittings, which makes the system more complex and can lead to high cost products. A qualitative comparison of the adsorption cycle over the conventional vapor compression cycle is presented in Table 1.

TABLE 1

Advantages and disadvantages of adsorption over vapor compression system

| | Advantages | Disadvantages |
|---|---|---|
| 1 | Requires low-grade heat source | Maintain high vacuum |
| 2 | No moving parts (no noise or vibration) | Intermittently working principle |

TABLE 1-continued

Advantages and disadvantages of adsorption over vapor compression system

| | Advantages | Disadvantages |
|---|---|---|
| 3 | Simple working principle | Commercial products are expensive |
| 4 | Very low operating and maintenance costs | Low COP |
| 5 | No corrosion and crystallization problems | Poor mass and heat transfer rate |
| 6 | Environmentally friendly | Large volume and weight |

Some embodiments include an evacuated tube solar adsorption heat pump (ETSAHP) module that is an adsorption heat pump system placed inside an evacuated tube solar collector. In some embodiments, an ETSAHP module comprises an evacuated transparent or semi-transparent tube (e.g., such as a glass tube) with a length of about 180 cm, and an internal diameter of 5.5 cm. In some embodiments, one side (top section of the tube) represents the adsorbent bed (generator) and contains the adsorbent, while the other side (bottom section of the tube) represents the condenser/evaporator and contains the refrigerant. As the adsorbent bed is exposed to solar radiation, the desorption process takes place where the saturated adsorbent gives away refrigerant vapor as its temperature increases where it gets condensed in the condenser (condenser/evaporator acts as a condenser in this case). When the adsorbent bed is shaded or the sun sets, the dry adsorbent absorbs refrigerant vapor during what is called the adsorption process and the cooling effect takes place (condenser/evaporator acts as a condenser in this case).

In some embodiments, multiple modules are connected in series through a manifold or duct to form an ETSAHP array, and several arrays are connected in series and parallel to cover the cooling or heating demands. In some embodiments, the array system is run substantially continuously by operating different arrays out of phase in which some arrays provide cooling while the rest are under regeneration (desorption) process. In some embodiments, the system is operated intermittently by regenerating the system during the day and store cooling in a thermal cooling storage during the night for the succeeding day load.

Some embodiments disclosed herein are scalable, potentially inexpensive, able to operate substantially continuously, and capable of holding and maintaining high vacuum with no leaks. Some embodiments include a closed mesh cage that holds the adsorbent and improves the heat and mass transfer of the adsorbent bed). Some embodiments include retrofit capabilities, where when a working pair is discovered after installing the ETSAHP system, only the adsorbent bed cage and its associated refrigerant need to be replaced without replacing anything else in the system.

Figure 4:
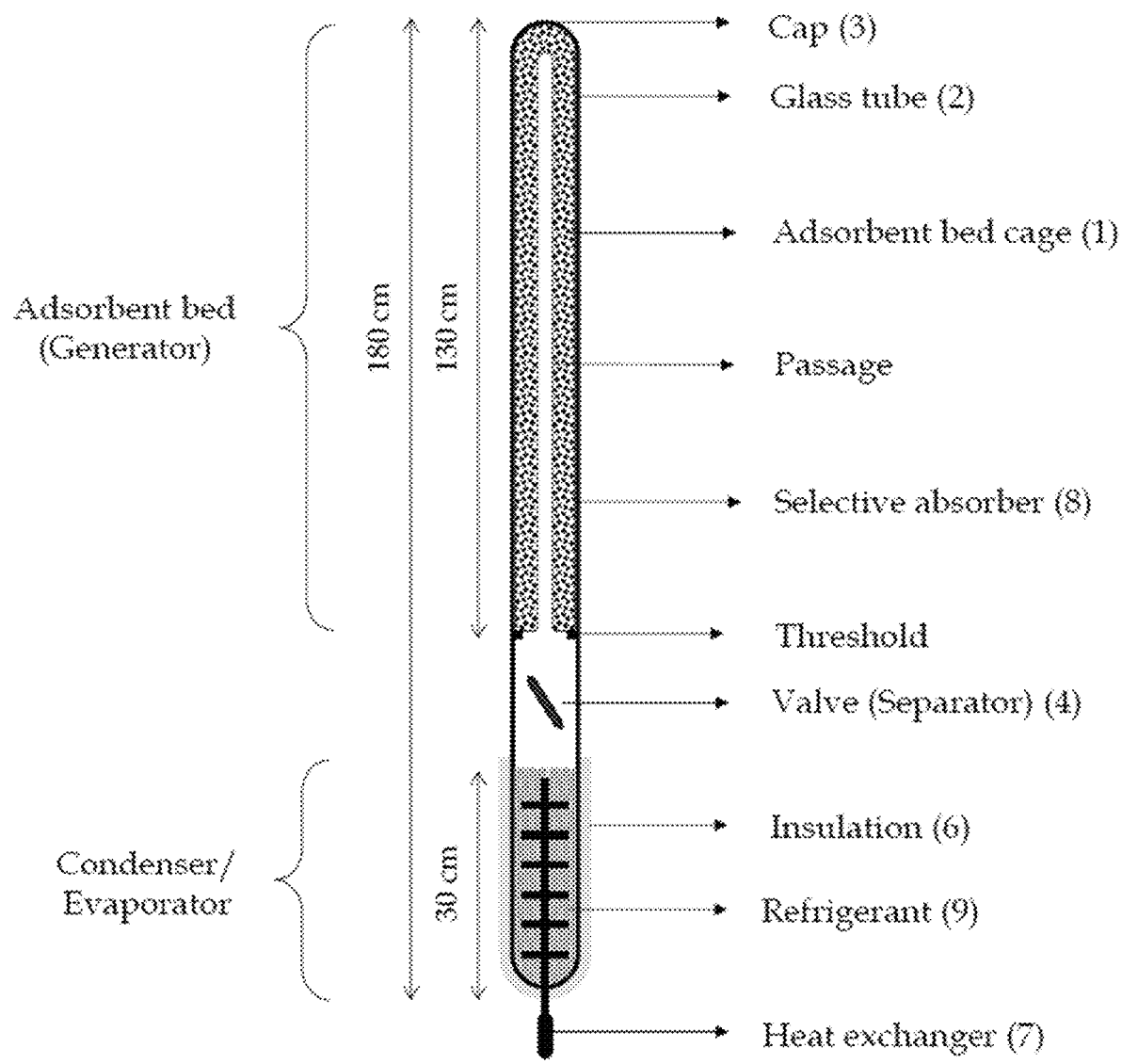
FIG. 4 depicts a schematic diagram of the evacuated tube solar adsorption heat pump module in accordance with the present invention.
Figure 5A:
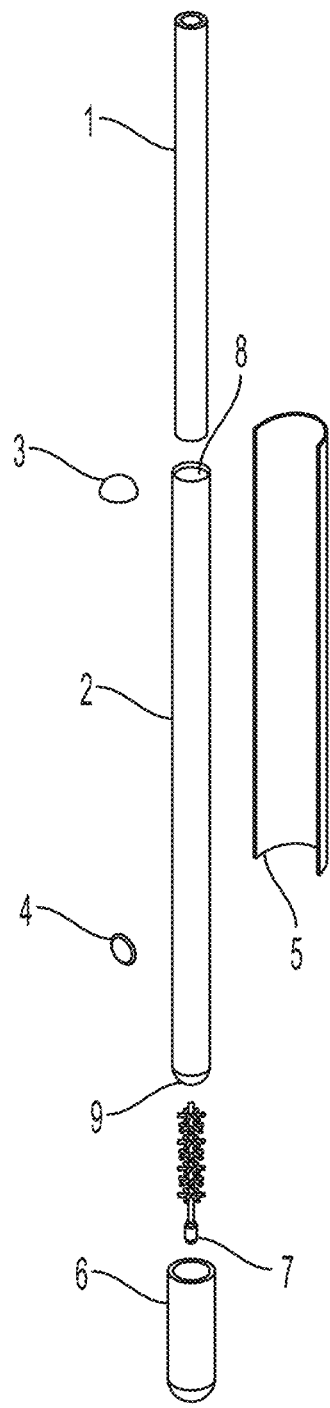
FIG. 5A depicts a 3D exploded view of the evacuated tube solar adsorption heat pump module in accordance with the present invention.
Figure 5B:
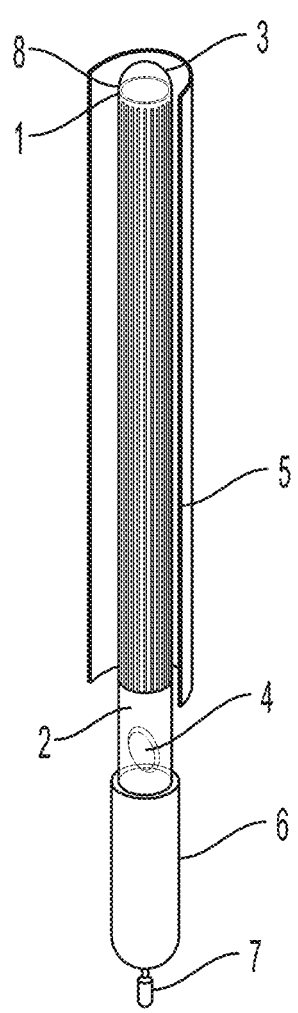
FIG. 5B depicts a 3D collapsed view of the evacuated tube solar adsorption heat pump module in accordance with the present invention.
Figure 6A:
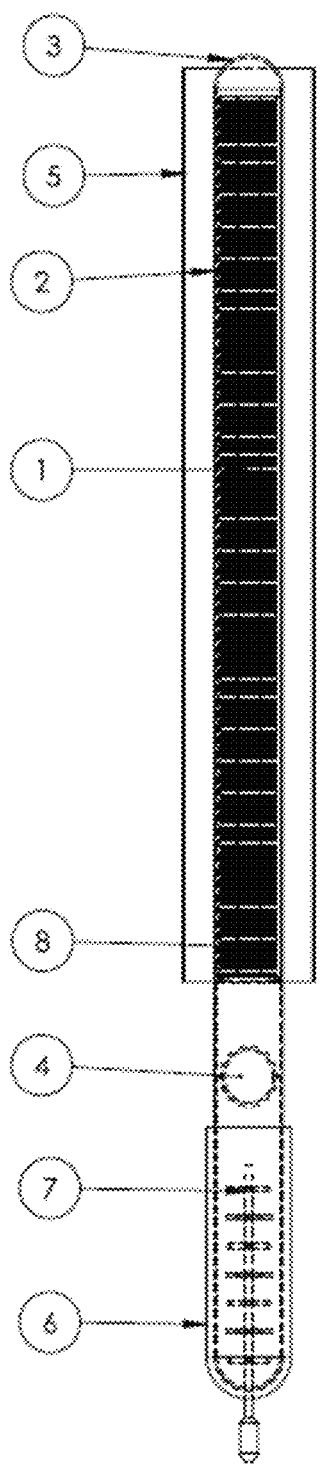
FIG. 6A depicts a 2D orthographic drawing of the evacuated tube solar adsorption heat pump module in a front view in accordance with the present invention.
Figure 6B:
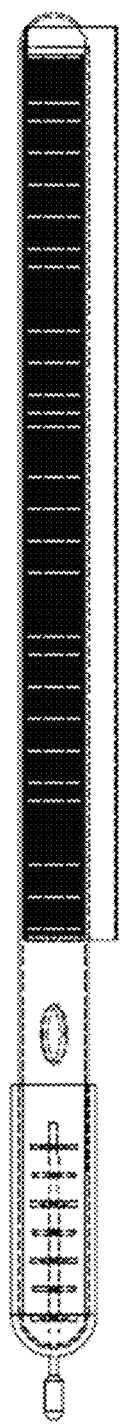
FIG. 6B depicts a 2D orthographic drawing of the evacuated tube solar adsorption heat pump module in a side view in accordance with the present invention.
Figure 6C:
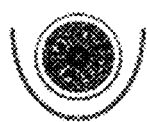
FIG. 6C depicts a 2D orthographic drawing of the evacuated tube solar adsorption heat pump module in a top view in accordance with the present invention.
Figure 7A:
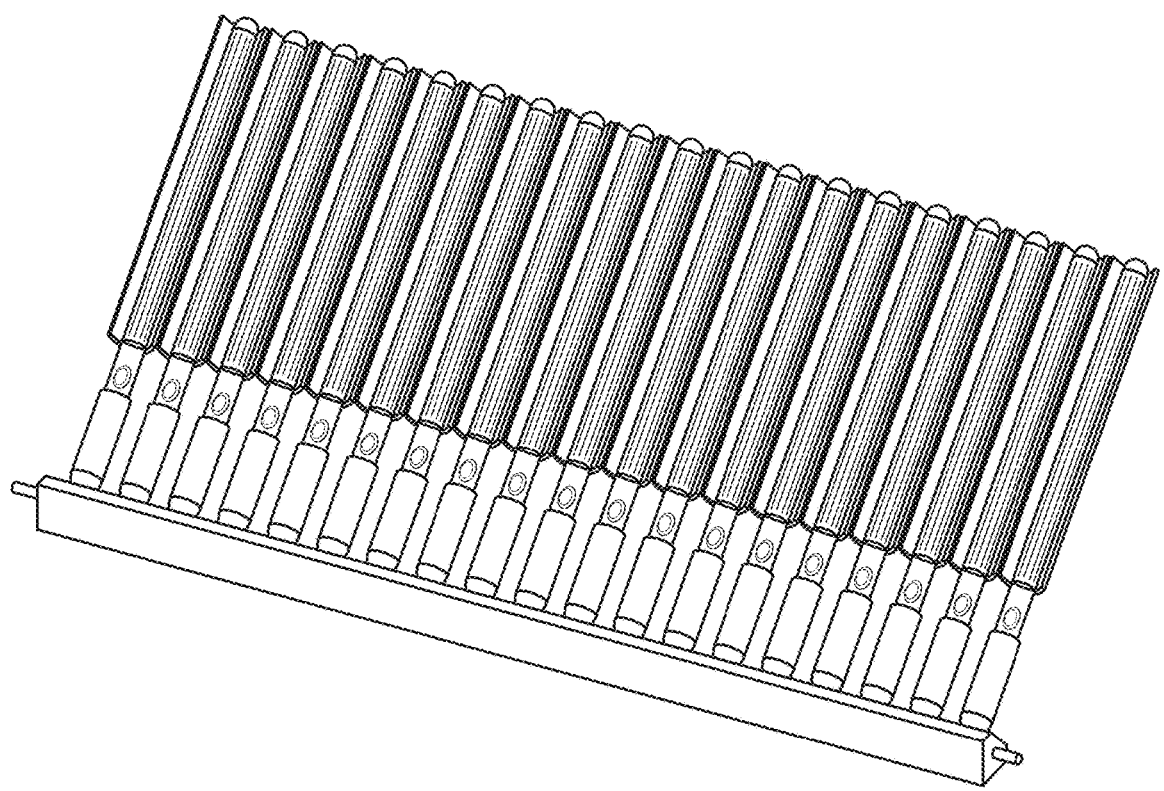
FIG. 7A depicts an isometric view of a 3D orthographic drawing of the evacuated tube solar adsorption heat pump array in accordance with the present invention.
Figure 7B:
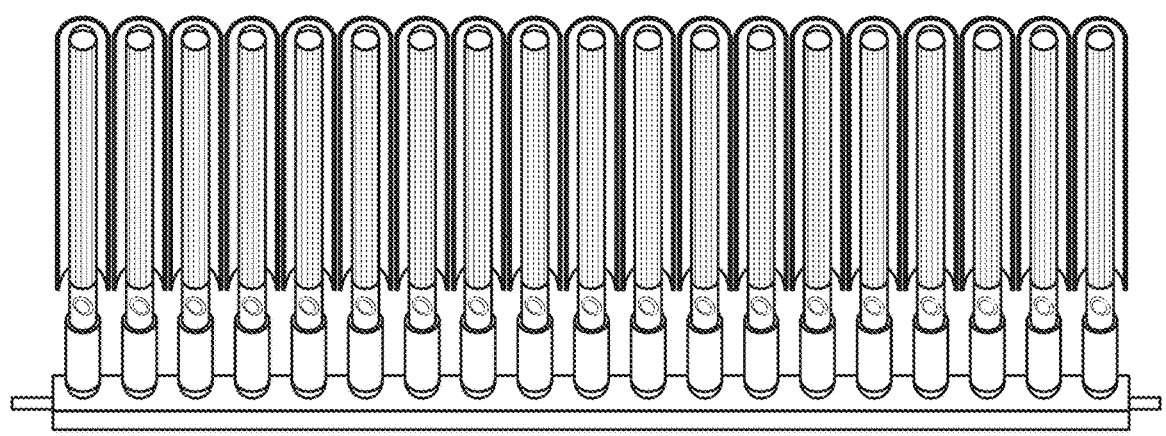
FIG. 7B depicts a top view of the 3D orthographic drawing of the evacuated tube solar adsorption heat pump array in accordance with the present invention.
Figure 7C:
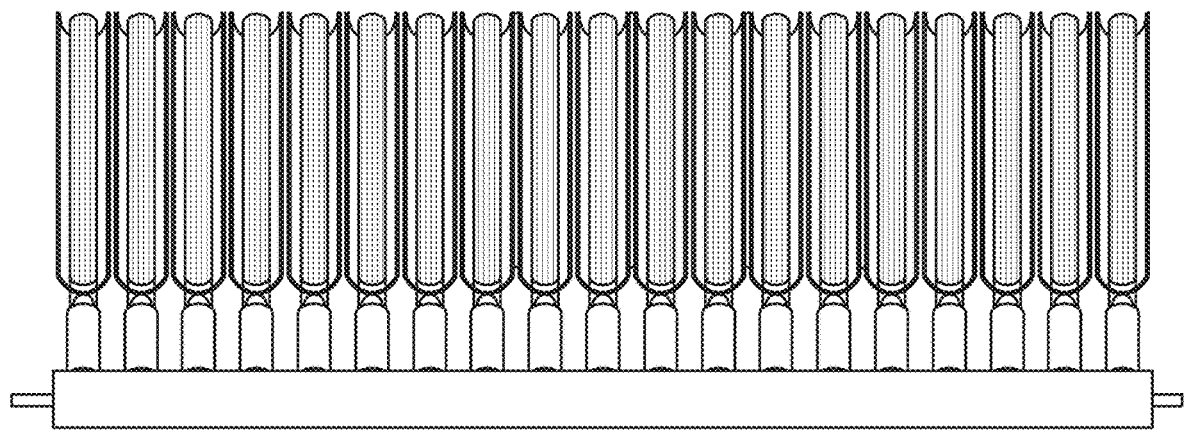
FIG. 7C depicts a front view of the 3D orthographic drawing of the evacuated tube solar adsorption heat pump array and in accordance with the present invention.
Figure 7D:
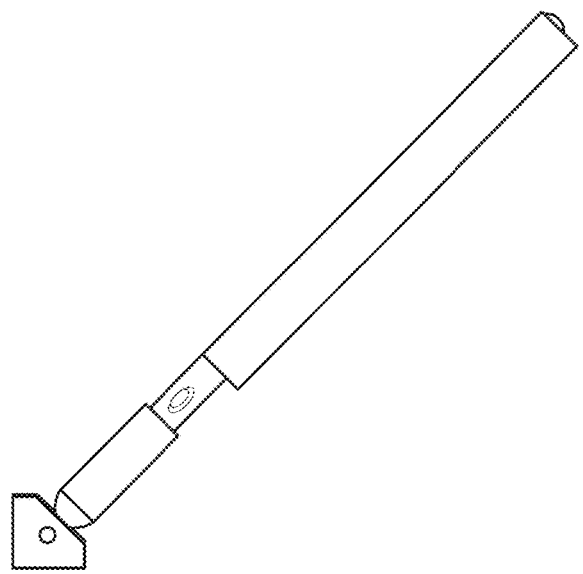
FIG. 7D depicts a side view of the 3D orthographic drawing of the evacuated tube solar adsorption heat pump array and in accordance with the present invention.

Some embodiments include the evacuated tube solar adsorption heat pump (ETSAHP) module as shown from FIG. 4 to FIG. 10. In some embodiments, the module is made of one piece of glass (or any transparent material) in which one side (top part) represents the adsorbent bed (generator) and the other side (bottom part) represents the condenser/evaporator as shown in FIG. 4. Some non-limiting embodiments include an ETSAHP module that is comprised of a tube with a length of about 180 cm, an internal diameter of about 5.5 cm, and a wall thickness of about 0.3 cm. The tube dimensions are presented here for the sake of example and are not to be considered as restrictions.

In some embodiments, during the desorption process, the top of the glass tube (adsorbent bed) is heated using solar energy. Meanwhile, the refrigerant is condensed with the help of a small fan or domestic water system at the bottom of the glass tube (acting as a condenser). As the sun sets or as the module gets shaded, the adsorbent bed (generator) starts to cool down and the adsorption process takes place. During the adsorption process, refrigerant at the bottom of the glass (acting as an evaporator) generates a cooling effect as the temperature-dependent pressure inside the tube reaches the refrigerant temperature at the end of the desorption process.

As shown in FIG. 4, the condenser/evaporator part is about 30 cm length and consists of the refrigerant 9, heat exchanger 7, and insulation 6. In some embodiments, this part of the module acts as a condenser during the desorption process and as an evaporator during the adsorption process. Even though the refrigerant's selection depends on the adsorbent choice, various refrigerants can be used, including, but not limited to, water, ammonia, methanol, ethanol, butane, etc. In some embodiments, the heat exchanger 7 is employed in order to enhance the heat transfer fluid between the refrigerant and load. The heat exchanger in all figures is illustrative and not to be considered as restrictive.

Figure 8A:
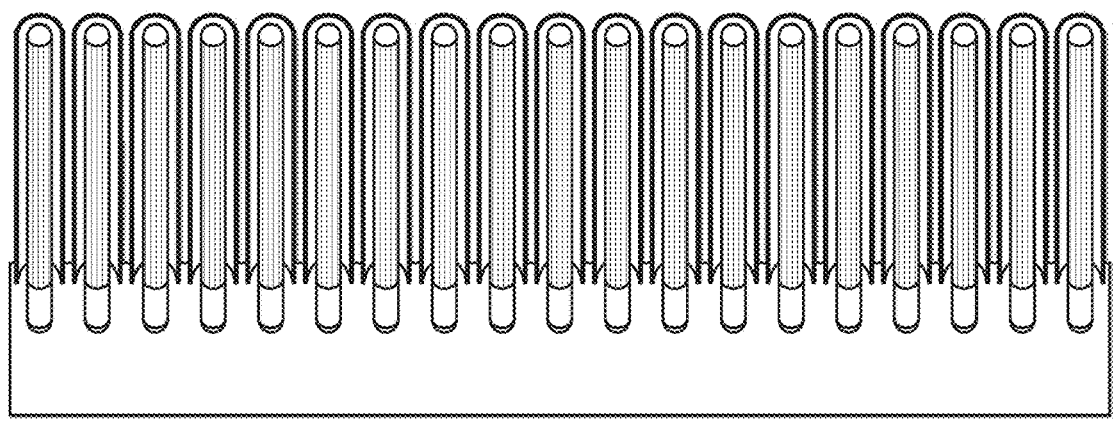
FIG. 8A depicts a top view of a 3D orthographic drawing of the evacuated tube solar adsorption heat pump array in accordance with the present invention.
Figure 8B:
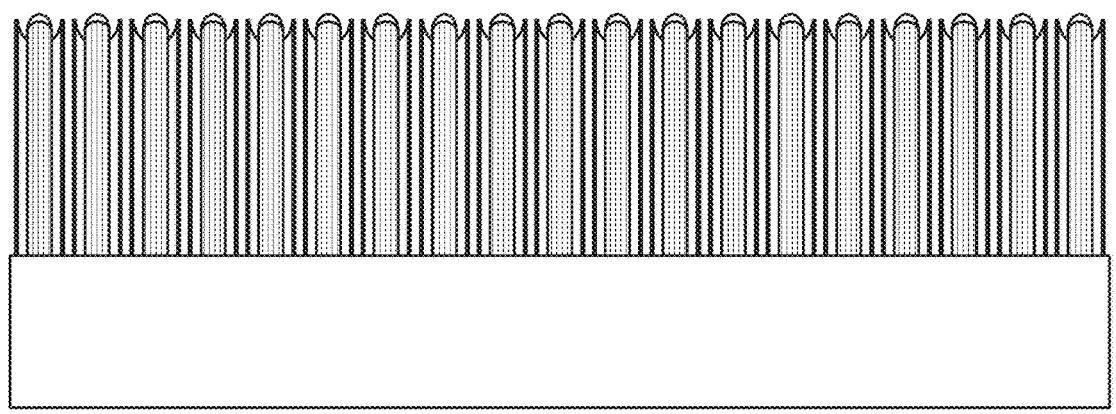
FIG. 8B depicts a front view of the 3D orthographic drawing of the evacuated tube solar adsorption heat pump array in accordance with the present invention.
Figure 8C:
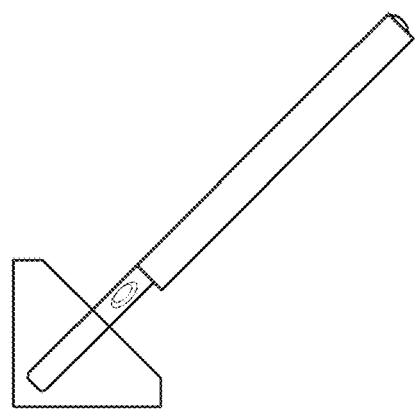
FIG. 8C depicts a side view of the 3D orthographic drawing of the evacuated tube solar adsorption heat pump array in accordance with the present invention.

In some embodiments, the insulation 6 is advantageous during the adsorption process (bottom part acts as an evaporator) in which it minimizes the heat absorption from the ambient through the tube wall to the evaporator. Conversely, in other embodiments, the insulation can be disadvantageous during the desorption process (bottom part acts as a condenser) as it prevents heat rejection through the tube insulation to the environment. If the external heat transfer fluid for heat rejection and absorption is liquid, such as water, then both the insulation and heat exchanger are likely necessary in which multiple modules are connected to an insulated manifold forming an array as shown in FIGS. 7A-7D. On the other hand, if the external heat transfer fluid is air, then a duct can be used instead of a manifold and both insulation and heat exchanger can be eliminated as shown in FIGS. 8A-8C.

Referring again to FIG. 4, some embodiments include incorporating a valve or separator 4 between the adsorbent bed and the evaporator/condenser that allows the system to act as a thermal cooling storage. In some embodiments, the valve (separator) does not need to completely isolate both sides but rather minimizes vapor flow rate from the evaporator to the adsorbent bed (generator). In some embodiments, the valve or separator is activated magnetically or thermally in order to keep the tube module completely sealed without any space to the outer environment. In some embodiments, the valve is also utilized during the transportation stage of the module if more refrigerant than what the adsorbent can hold is desirable. In some embodiments, the valve/separator 2 can be eliminated with no significant impact on the ETSAHP module performance, however, the system may lose the ability to be used as a thermal cooling storage.

Figure 11:
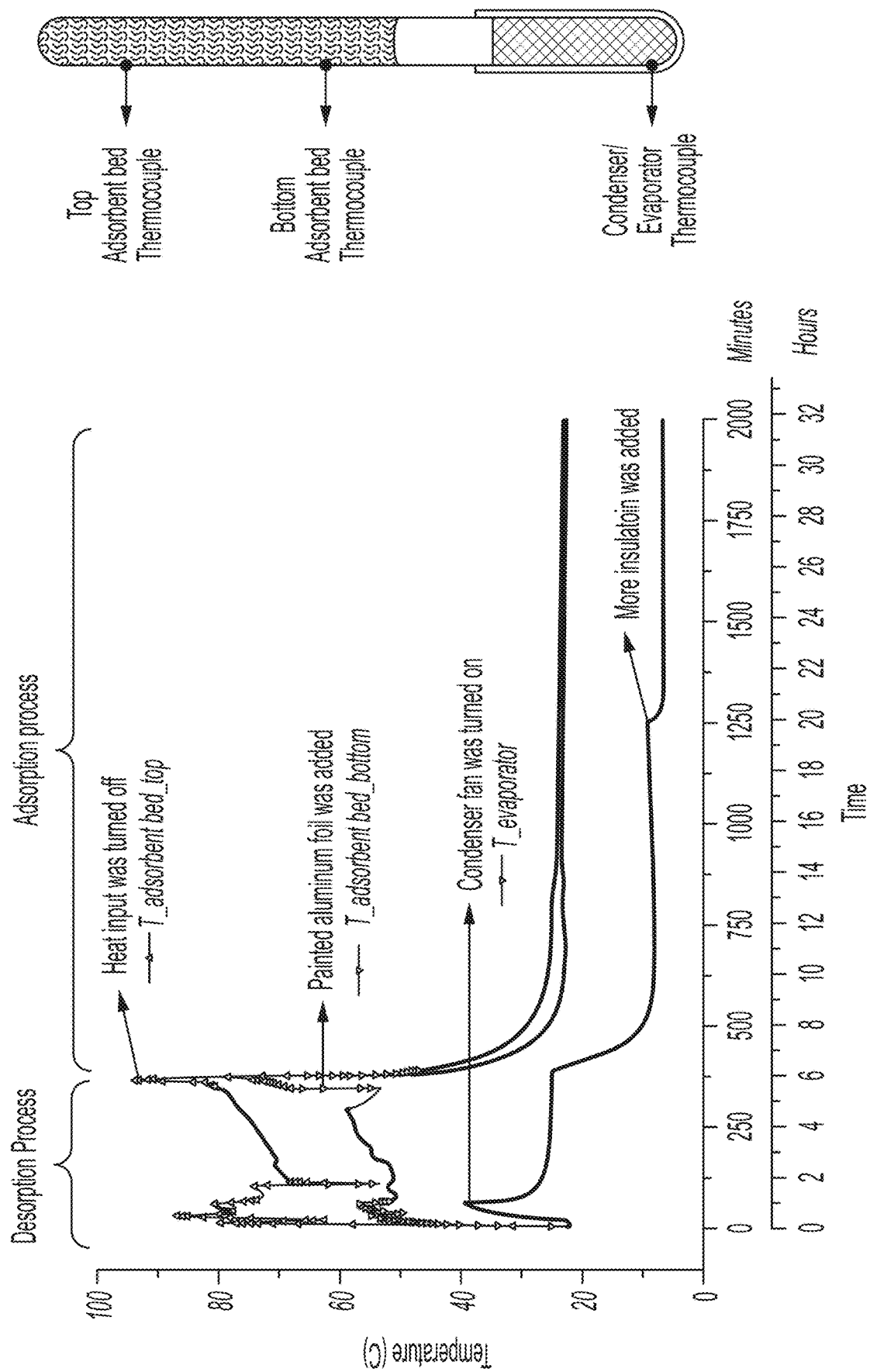
FIG. 11 depicts the initial experimental result of the evacuated tube solar adsorption heat pump module in accordance with the present invention.

As shown in FIG. 4, in some embodiments, the top section of the ETSAHP module represents the adsorbent bed (generator) which mainly consists of adsorbent bed cage 1 that contains the adsorbent such as but not limited to silica gel, zeolite, etc. One of the major disadvantages of the adsorption heat pump system, as shown in Table 1, is poor mass and heat transfer in the adsorbent bed. The design of adsorbent bed cage 1 can vary from the prototype shown and described in which the top part of the tube is filled with silica gel (as shown in FIG. 11) and used a filter mesh disc to prevent the silica gel beads from falling into the refrigerant. In some embodiments, 3D printing is used to fabricate any of the components described herein including the adsorbent bed cage.

Some embodiments include a selective absorber 8 that is employed at the top part (generator) of the evacuated tube solar adsorption heat pump (ETSAHP) module in order to increase the operation temperature and module's efficiency. In some embodiments, the selective absorber is added between two layers of the glass wall to increase its lifetime, or to its inner wall to minimize the thermal resistance compared to the outer wall. In some embodiments, if the selective absorber 8 is to be incorporated to the wall of the adsorbent bed cage 1, then a space between the tube glass and the adsorbent bed cage is preferable. It is anticipated that the refrigerant vapor during the desorption process will be condensed more effectively on the tube wall since its temperature is expected to be lower than the adsorbent bed cage temperature and accumulated faster by gravity.

Some embodiments include working pairs, such as, but not limited to, zeolite-water, that require higher temperatures (about 180° C.) which is achieved by incorporating reflectors as the one in the solar compound parabolic concentrator (CPC) as shown in FIGS. 5A to 8C. In some embodiments, reflector 5 ensure the temperature is substantially uniform in the radial direction, especially at higher temperatures (e.g., about 180° C.). In some embodiments, the reflector can be eliminated if the required temperature is low such as that when the working pair is silica gel and water.

Figure 9:
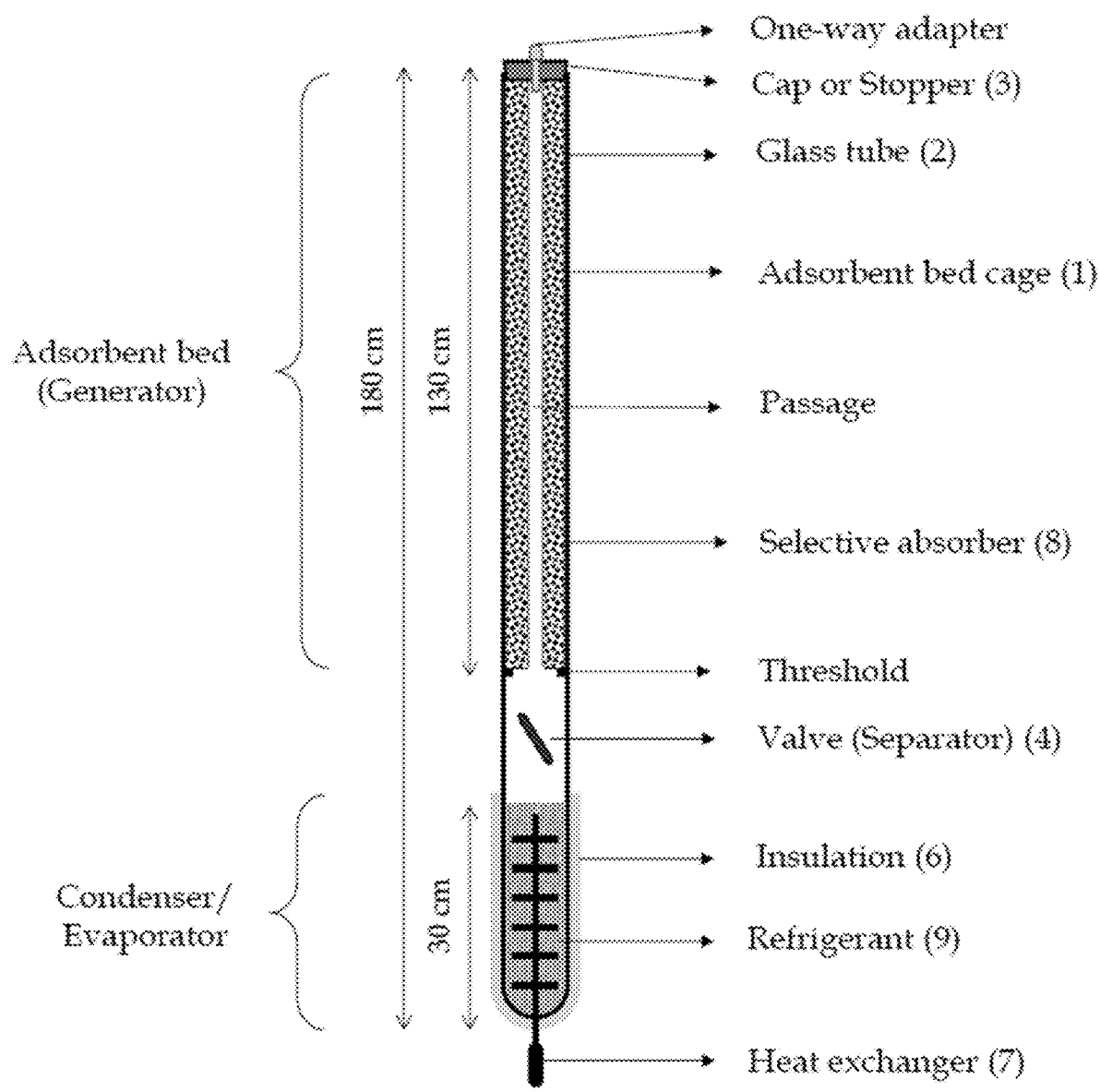
FIG. 9 depicts another schematic diagram of the evacuated tube solar adsorption heat pump module in accordance with the present invention.

A feature that distinguishes some embodiments of the invention from conventional systems is the ability to maintain high vacuum. For any adsorbent that does not degrade with time, it is possible to make an evacuated tube solar adsorption heat pump (ETSAHP) module that is completely sealed and runs for extended periods, similar to what is done for incandescent light bulbs. In this instance, whole system is assembled by the manufacturer which allows them to create very high vacuum using special techniques and vacuum pump during the manufacturing process. Another technique that can be used to increase vacuum is to fill the tube with steam at a temperature above ambient, evacuate and seal the tube, and then allow the tube to cool to room temperature. This will condense the steam and thereby create more vacuum as presented in all figures with cap 3 except for FIG. 9. If the glass tube, adsorbent bed cage, and other components are not assembled by the same manufacturer, or the adsorbent is to be replaced frequently, then the cap can be replaced by a cap/stopper 3 with one-way adapter that allows evacuation of air from the tube but does not allow the air to enter the glass tube module as shown in FIG. 9. Note that the design of the cap 3 in all figures except FIG. 9 and cap/stopper 3 in FIG. 9 are illustrative and not to be considered as restrictions.

Figure 10:
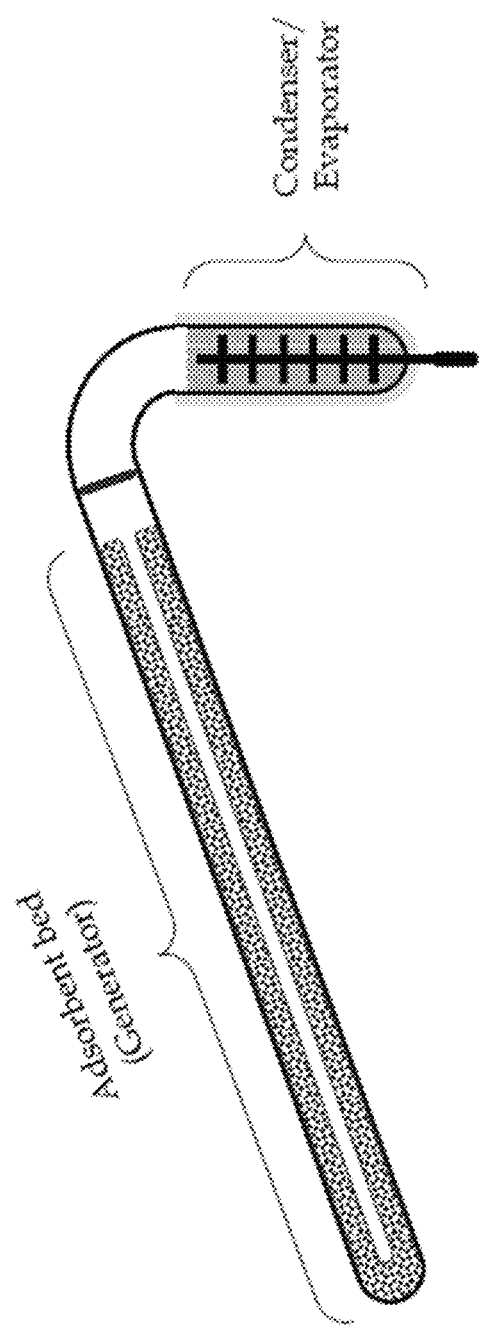
FIG. 10 depicts another schematic diagram of the evacuated tube solar adsorption heat pump module in accordance with the present invention.

In embodiments where the evacuated tube solar adsorption heat pump (ETSAHP) module is implemented in areas where the module is to be placed horizontally or nearly horizontal, some embodiments include a module where the glass tube is bent and the condenser/evaporator part of the tube is kept vertical or nearly vertical as shown in FIG. 10. In some embodiments, the angle between the adsorbent bed section and the condenser/evaporator section is designed so that the adsorbent bed part provides shading to the condenser/evaporator part and increases the system performance.

In some embodiments, it is preferable that the whole tube is made of one piece of glass, however, it is possible to make the bottom part (condenser/evaporator part) including a valve from other materials such as copper, stainless steel, polyvinyl chloride (PVC), etc.

In some embodiments, multiple evacuated tube solar adsorption heat pump (ETSAHP) modules are connected in series to form an evacuated tube solar adsorption heat pump (ETSAHP) array as shown in FIGS. 7A-7D and FIG. 8A-8C. In some embodiments, an ETSAHP array is comprised of modules that contain the same working pairs or even different working pairs in order to cascade the temperature. For instance, if the modules at the beginning contain water as a refrigerant and few modules at the end contain ammonia or methanol, this can allow the load to reach temperatures below zero degrees Celsius. In some further embodiments, multiple ETSAHP arrays are connected in series or parallel to handle to cooling or heating loads.

In some embodiments, the ETSAHP system (multiple arrays connected in parallel and series) is operated intermittently and continuously. In the intermittent operation, the ETSAHP system is configured to be regenerated during the day time when the sun is available, and the ETSAHP system generates cooling during the night. In this case, a thermal cooling storage tank (ice, phase change material, etc.) may be required in order to use it the next day. In some embodiments, in the case of continuous operation, shading some arrays during the day while other arrays (unshaded ones) are exposed to the sun light may be required in order to generate cooling continuously by operating different arrays out of phase. In some embodiments, this is done in different ways, for example, by installing some arrays facing east in which the desorption process takes place early in the morning, and by noon where they are shaded to start the adsorption process (producing cooling). In opposition, in some embodiments, arrays that face west provide cooling in the morning and desorb (regenerate) in the afternoon. In some embodiments, intermittent operation has the advantage of increasing the system overall efficiency over the continuous operation since the ambient temperature during the night is lower.

In some embodiments, during the desorption process, when the condenser/evaporator acts as a condenser, heat rejection by the entire (ETSAHP) array is capitalized to provide domestic hot water in which the manifold is switched to circulate the hot water loop. Similarly, in some embodiments, during the adsorption process (the condenser/evaporator acts as an evaporator), the same manifold can be connected to the cooling storage. Such a configuration is attractive especially for intermittent operation.

An initial experiment was conducted on an actual evacuated tube solar adsorption heat pump (ETSAHP) module. During the adsorption process, the evaporator was completely insulated to measure the minimum achievable temperature with no heat exchange (i.e., zero cooling load). The results of an initial experiment for both the adsorption and desorption processes of the evacuated tube adsorption module are shown in FIG. 11. Three thermocouples were placed on the outer wall of the glass tube with two at the adsorbent bed (one at the top and the other at the bottom), and the third thermocouple was placed on the outer glass tube wall of the condenser evaporator.

Figure 12:
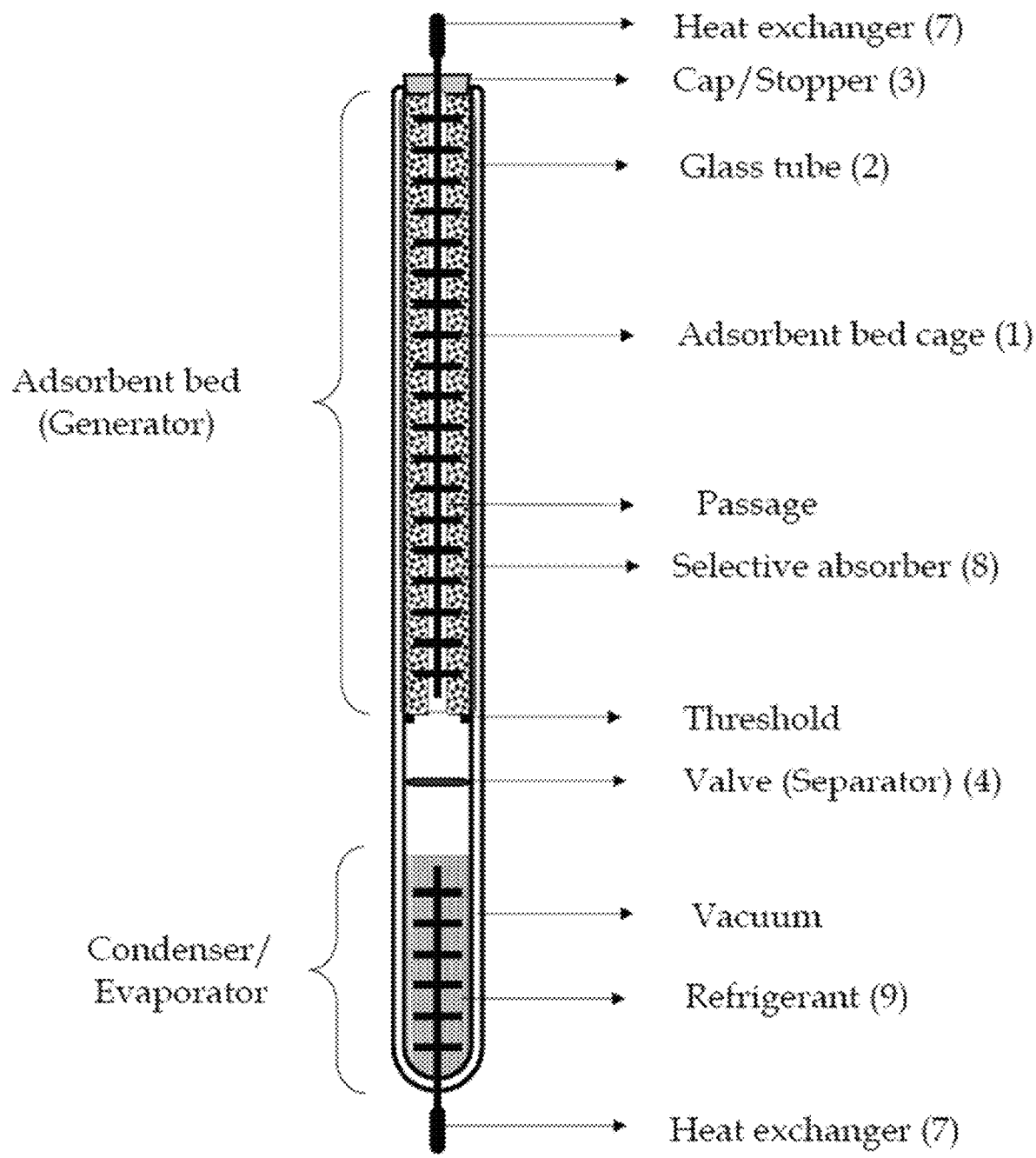
FIG. 12 depicts another schematic diagram of the evacuated tube solar adsorption heat pump module in accordance with the present invention.

In some embodiments, when a double walled (twin wall) tube is used (as it has been mass produced due to its reliability with evacuated tube solar collectors), an additional heat exchanger for the adsorbent bed might be required as shown in FIG. 12. This alternative design capitalizes existing evacuated tube solar collectors with an existing selective absorber to be used as evacuated tube solar adsorption heat pump (ETSAHP) modules.

Figure 13:
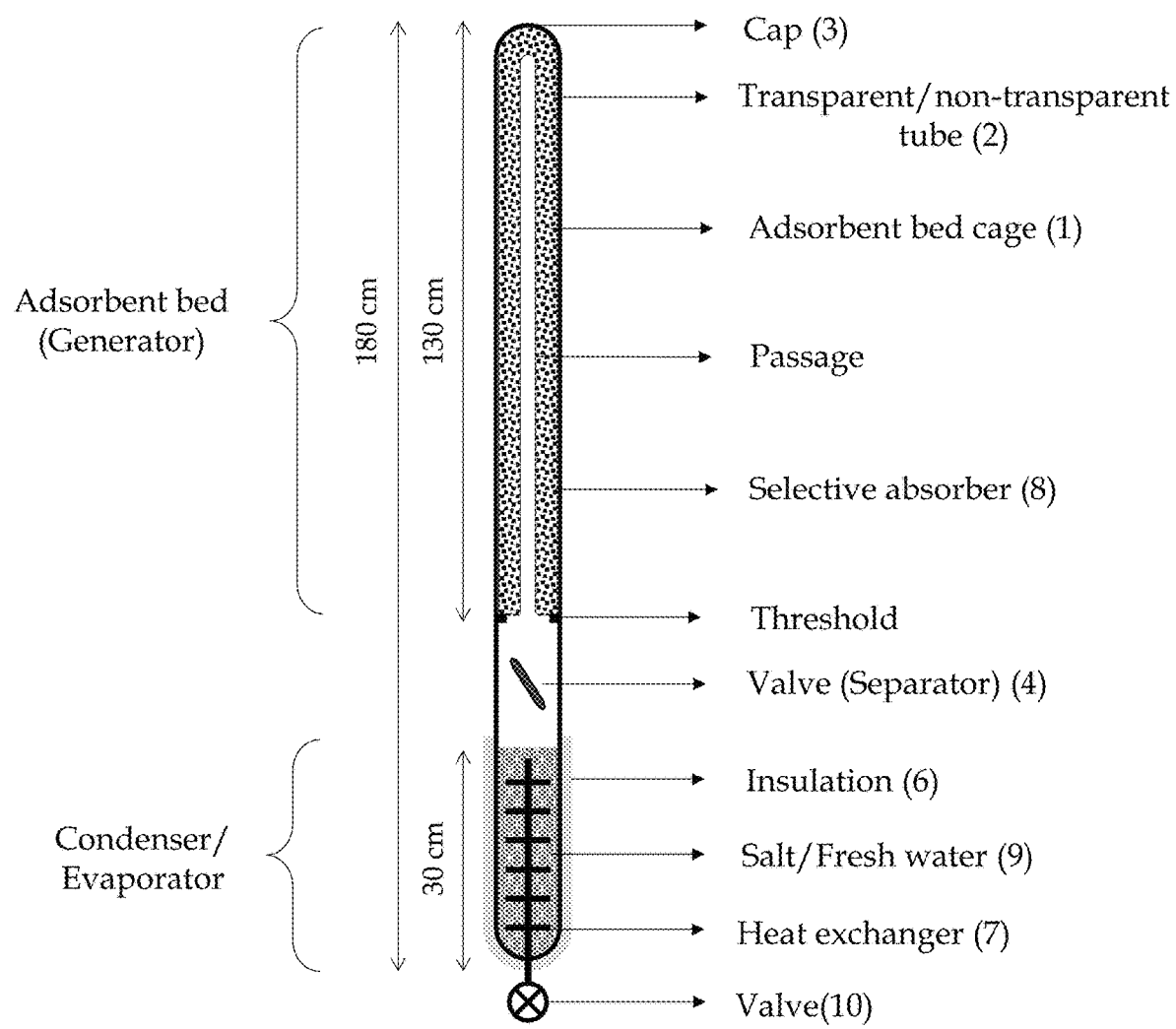
FIG. 13 depicts a schematic diagram of an evacuated tube adsorption heat pump desalination (ETAHP&D) module in accordance with the present invention.

FIGS. 13-23 illustrate an evacuated tube adsorption heat pump and desalination (ETAHP&D) module. Similar to the ETSAHP modules shown in FIGS. 4-10 and 12 and described above, the evacuated tube adsorption heat pump and desalination (ETAHP&D) module is a tube that is made of transparent or nontransparent material in which one side (top part) represents the Adsorbent Bed (Generator) and the other side (bottom part) represents the Condenser/Evaporator. This is shown in FIG. 13. Note that the solar energy is illustrative as the heat source in FIGS. 16, 18, and 20, and is not to be considered as a restriction.

The ETAHP&D module is comprised of a tube with a length of about 180 cm, an internal diameter of 5.5 cm, and a wall thickness of 0.3 cm. Note that these tube dimensions are the dimensions of an initial design and are presented here for the sake of example and are not to be considered as restrictions.

At the beginning of the working cycle, salt water is added to the tube via a valve 10 at the bottom of the tube as shown in FIG. 13. The tube is put under vacuum using a vacuum pump, and then the valve 10 is closed. Due to the absence of the energy source, the dry adsorbent (such as silica gel, zeolite, activated carbon, etc.) in the adsorbent bed cage 1 tends to absorb the water vapor generated from the salt water 9 as a result of the low pressure inside the tube. Consequently, the temperature of the salt water (functioning as a refrigerant) goes down, generating a cooling effect due to the pressure-temperature dependence. This process is the desorption process, as shown in FIGS. 15-20. At the end of the desorption process, the valve 10 is opened and the brine (concentrate) is drained out of the tube.

During the desorption process, energy is applied to one side of the tube that has the adsorbent bed as shown in FIGS. 16B, 18B, and 20B. As the temperature of the saturated adsorbent increases, the adsorbent releases the water vapor, which is then condensed as a fresh water with or without the help of a small fan or domestic water system at the bottom of the tube (acting as a condenser).

As shown in FIG. 13, the condenser/evaporator part of the module is about 30 cm in length and consists of the refrigerant (salt/fresh water) 9, the heat exchanger 7, the valve (connector) 10, and the insulation 6. The condenser/evaporator part of the module acts as a condenser during the desorption process (water generation) and as an evaporator during the adsorption process (cooling generation). The adsorbent's selection depends on its compatibility with the salt/fresh water refrigerant and may, for example, be one of silica gel, activated carbon, zeolite, etc. The heat exchanger 7 is employed in order to enhance the heat transfer fluid between the refrigerant and load. Note that the design of heat exchanger in all figures are illustrative and not to be considered as a restriction.

The valve (connector) 10 allows the addition of salt water, draining of fresh water or concentrate, and may be used to create the vacuum. With the purpose of minimizing the number of used valves, a connector 10, as shown in FIGS. 21A-21B can be used instead of a valve to connect the ETAHP&D module to a manifold that has one valve.

Figure 21A:
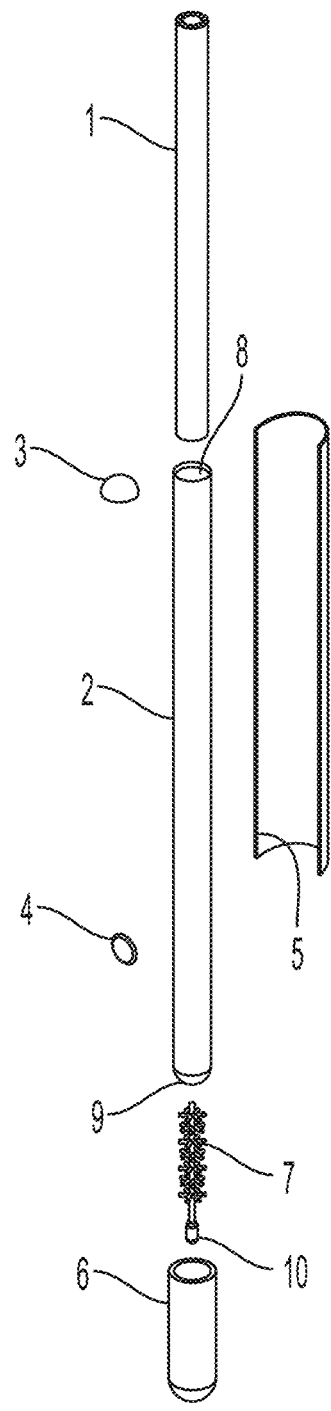
FIG. 21A depicts a 3D exploded view of the evacuated tube solar adsorption heat pump and desalination module in accordance with the present invention.
Figure 21B:
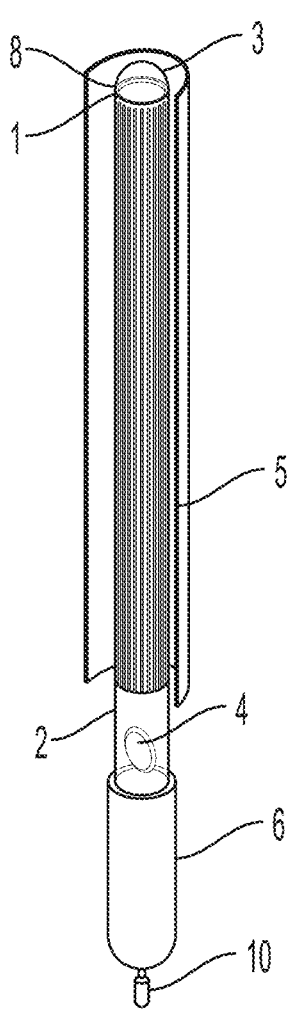
FIG. 21B depicts a 3D collapsed view of the evacuated tube solar adsorption heat pump and desalination module in accordance with the present invention
Figure 22A:
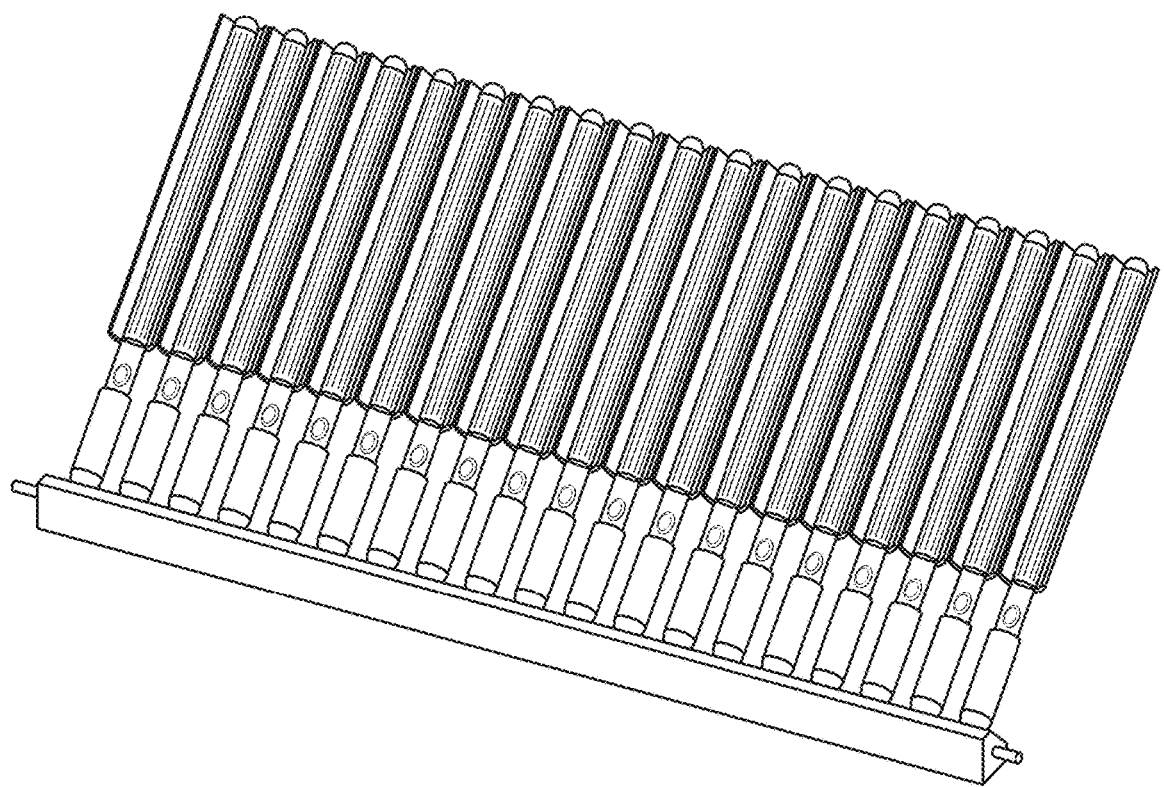
FIG. 22A depicts an isometric view of an evacuated tube solar adsorption heat pump and desalination array in accordance with the present invention.
Figure 22B:
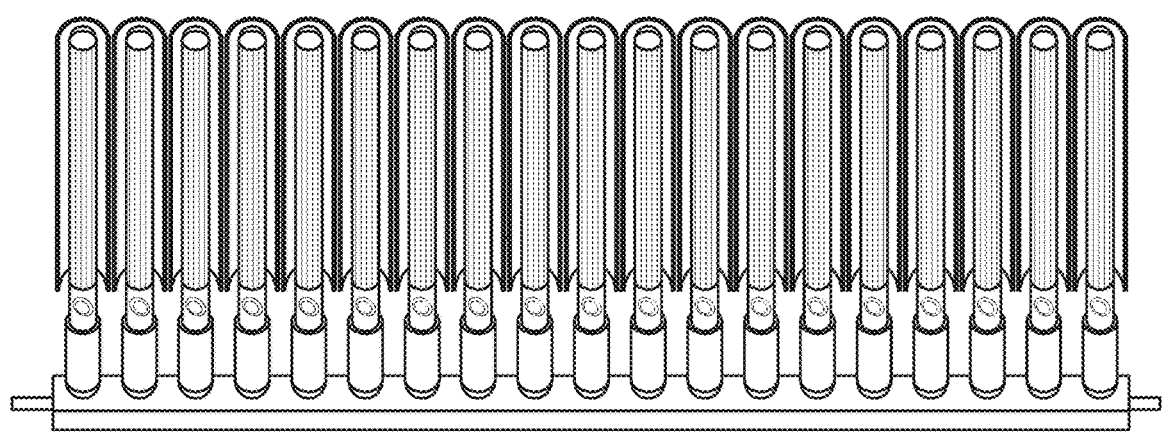
FIG. 22B depicts a top view of the evacuated tube solar adsorption heat pump and desalination array of FIG. 22A in accordance with the present invention.
Figure 22C:
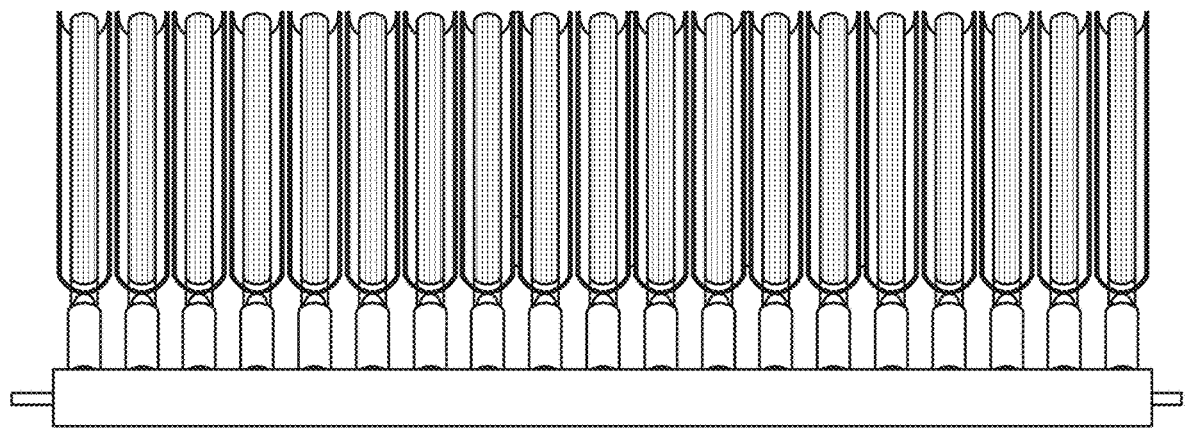
FIG. 22C depicts a front view of the evacuated tube solar adsorption heat pump and desalination array of FIG. 22A in accordance with the present invention.
Figure 22D:
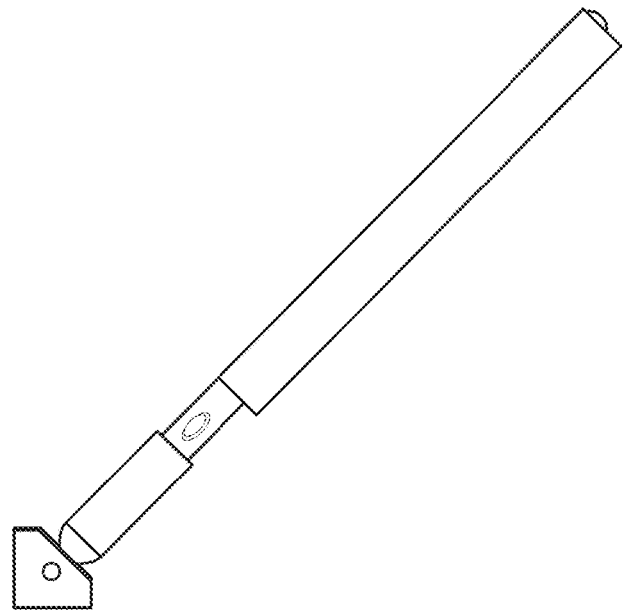
FIG. 22D depicts a side view of the evacuated tube solar adsorption heat pump and desalination array of FIG. 22A in accordance with the present invention.

With continued reference to FIGS. 21A-21B, the insulation 6 is advantageous during the adsorption process (bottom part acts as an evaporator) in which it minimizes the heat absorption from the ambient surroundings of the module, through the tube wall, and to the evaporator. Conversely, the insulation is disadvantageous during the desorption process (bottom part acts as a condenser) as it prevents heat rejection through the tube insulation to the environment. If the external heat transfer fluid for heat rejection and absorption is liquid, such as water, then both the insulation and heat exchanger are likely necessary in which multiple modules are connected to an insulated manifold forming an array as shown in FIGS. 22A-D.

Figure 23:
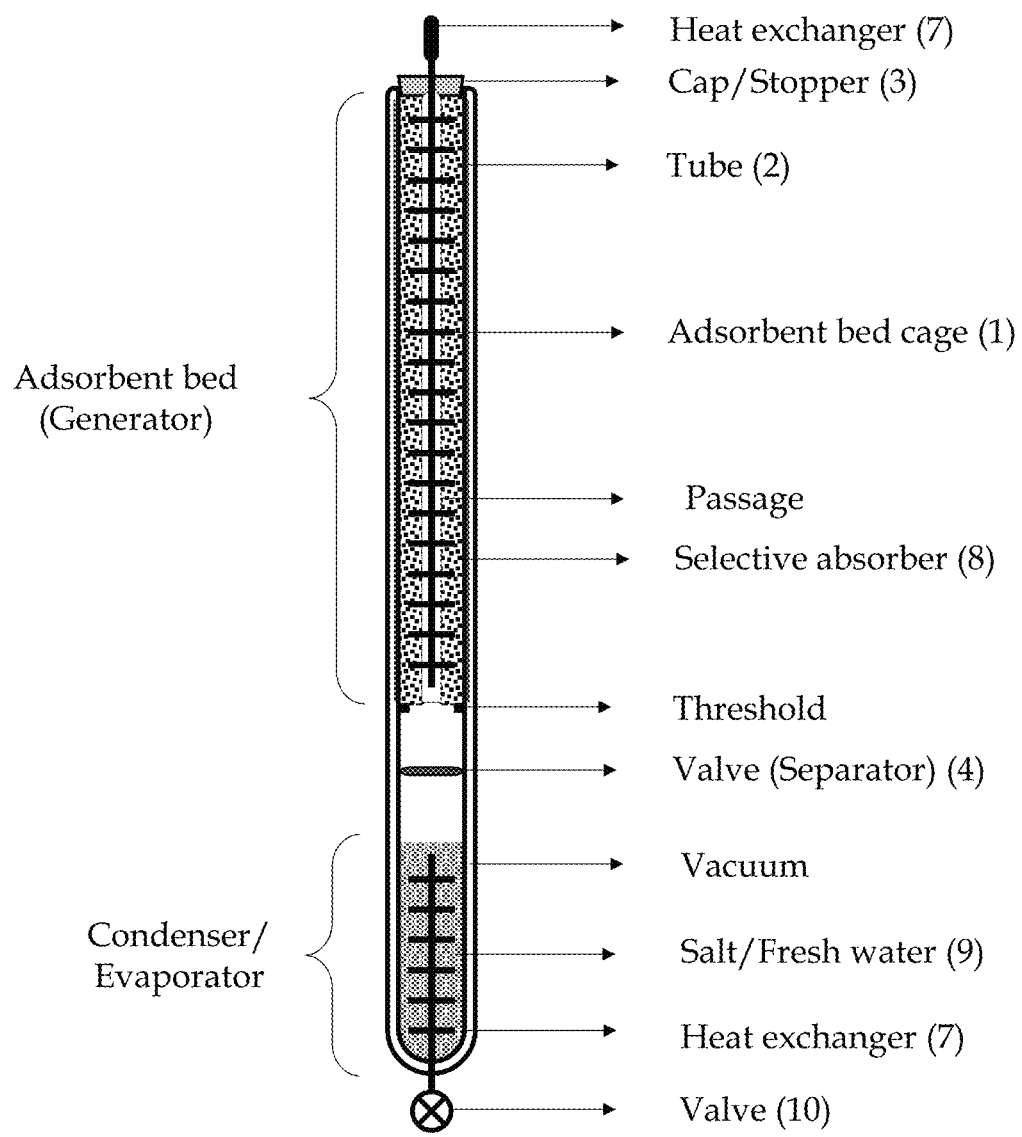
FIG. 23 depicts a schematic diagram of another evacuated tube adsorption heat pump desalination module in accordance with the present invention.

In some embodiments, as shown in FIG. 23, a vacuum space is created between the tube 2 and a second tube that surrounds the first tube. A vacuum is generated within the vacuum space (e.g., via a vacuum pump) and functions as insulation between the tube 2 and the environment (i.e., surroundings of the tube 2). In some embodiments, the twin tube arrangement with the vacuum space therebetween may be used in place of the insulation 6. In other embodiments, the vacuum space may be filled with a gas to decrease the heat transfer between the contents of the tube 2 and the environment.

Incorporating a simple valve or separator 4 between the adsorbent bed and the evaporator/condenser would allow the system to act as a thermal cooling storage. Similar to the valve described above with reference to FIGS. 4-10 and 12, it is worth noting that the valve (separator) does not need to completely isolate both sides but rather minimize evaporation rate from the evaporator to the adsorbent bed (generator). The valve or separator is preferably to be activated magnetically or thermally in order to keep the tube module completely sealed without any space to the outer environment. The valve is also utilized during the transportation stage of the module if more refrigerant than what the adsorbent can hold is desirable. Note that the valve/separator 4 can be eliminated with no large impact on the ETAHP&D module performance, however, the system would lose its ability to be used for thermal cooling storage.

As shown in FIG. 13 the top section of the ETAHP&D module represents the adsorbent bed (generator) which mainly consists of adsorbent bed cage 1 that contains the adsorbent (e.g., silica gel, zeolite, activated carbon, etc.). One of the major disadvantages of the adsorption heat pump system is poor mass and heat transfer in the adsorbent bed. The design of the adsorbent bed cage 1 can vary from very simple design as in our initial prototype in which we filled the top part of the tube with silica gel (as shown in FIG. 9) to very complex designs. Designing a complex adsorbent bed cage is achievable by using 3D printing for instance in order to improve the heat and mass transfer through the adsorbent. The adsorbent bed cage is analogous to a membrane in reverse osmosis. The ETAHP&D module allows manufacturers, developers, and researchers to compete and develop an adsorbent bed cage 1 that is inexpensive and efficient. Note that the design of adsorbent bed cage 1 in all figures are illustrative and not to be considered as restrictions.

The evacuated tube adsorption heat pump and desalination (ETAHP&D) tube 2 can be made out of any material such as metals, glass, polyvinyl chloride (PVC), etc. in which used energy source play a part (for example, solar energy propagates through glass). It is preferable that the whole tube 2 is made of one piece, however, it is possible to make the condenser/evaporator part including a valve from other materials such as copper, stainless steel, Polyvinyl chloride (PVC), etc.

If solar energy is to be harnessed, a selective absorber 8 is employed at the part of the tube that contains the adsorbent bed cage (generator) of the evacuated tube solar adsorption heat pump (ETSAHP) module in order to increase the operation temperature and module's efficiency. The selective absorber is preferably added between two layers of the glass wall to increase its lifetime, if not then to its inner wall to minimize the thermal resistance compared to the outer wall. If the selective absorber 8 is to be incorporated to the wall of the adsorbent bed cage 1, then it may be incorporated to a space between the tube glass and the adsorbent bed. It is anticipated that the water vapor during the desorption process will be condensed more effectively on the tube wall since its temperature is expected to be lower than the adsorbent bed cage temperature and accumulated faster by gravity.

Some working pairs, such as zeolite-water, require higher temperatures (about 180° C.) which can possibly be achieved (if solar energy is harnessed) by incorporating reflectors as the one in the solar compound parabolic concentrator (CPC) as shown in FIGS. 21A-21B. The reflector 5 also keeps the temperature uniform in the radial direction especially at higher temperatures. The reflector can be eliminated if the required temperature is low, for example, when the working pair is silica gel and water.

Figure 14:
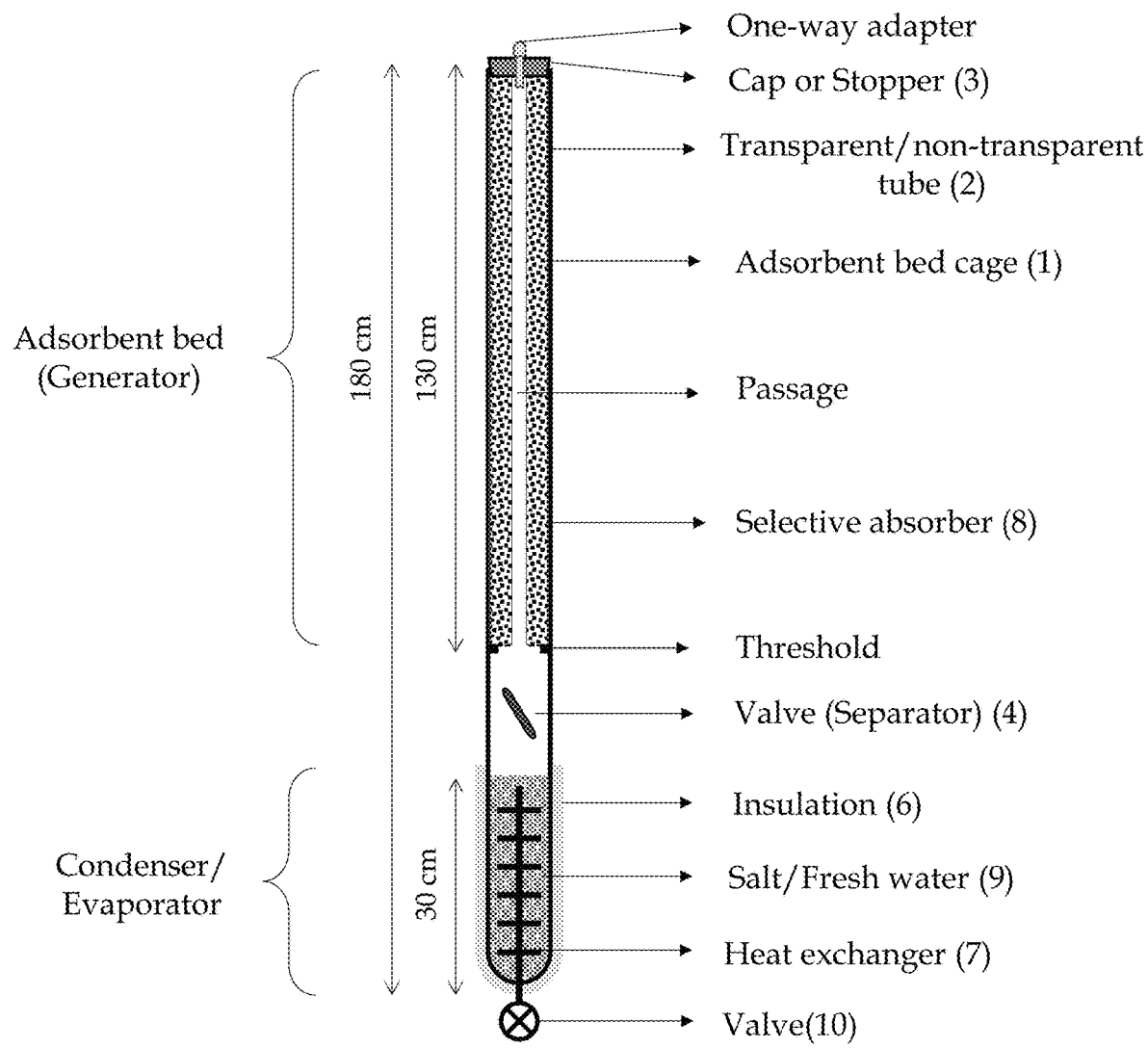
FIG. 14 depicts a schematic diagram of another evacuated tube adsorption heat pump desalination module in accordance with the present invention.
Figure 15:
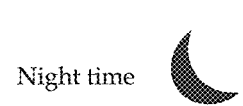
FIG. 15 depicts a schematic diagram of an evacuated tube adsorption heat pump and desalination module in an adsorption process for cooling generation.
Figure 15:
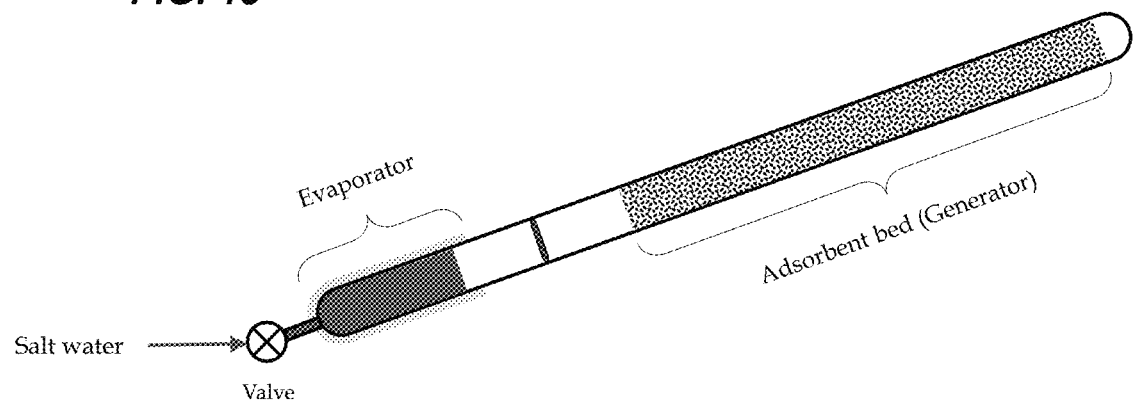
Figure 16:
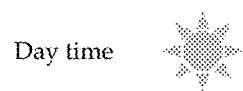
FIG. 16 depicts a schematic diagram of the evacuated tube adsorption heat pump and desalination module of FIG. 15 in a desorption process for water generation.
Figure 16:
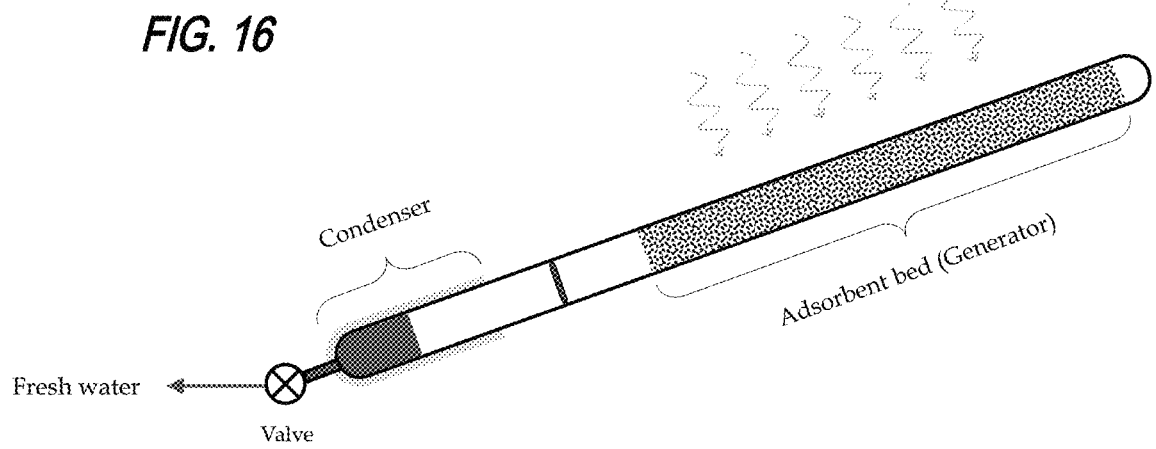

Since the ETAHP&D model undergoes adsorption (cooling generation) and desorption (water generation) processes, the model must lose/create vacuum every cycle. Therefore, a one-way adapter 3 (w/o a cap/stopper) is used to allow the air to evacuate from the tube but does not allow the air to enter the tube module as shown in FIG. 14. If the adsorbent bed cage, and other components inside the tube are to be frequently replaced, then the cap 3 in FIG. 13 is replaced by a cap/stopper as shown in FIG. 14. Note that the design of the cap/stopper in all figures are illustrative and not to be considered as restrictions. If the components inside the tube are not to be replaced or if the tube is comprised of multiple combined tubes, the vacuum can be attained from valve 10 as well.

Figure 17:
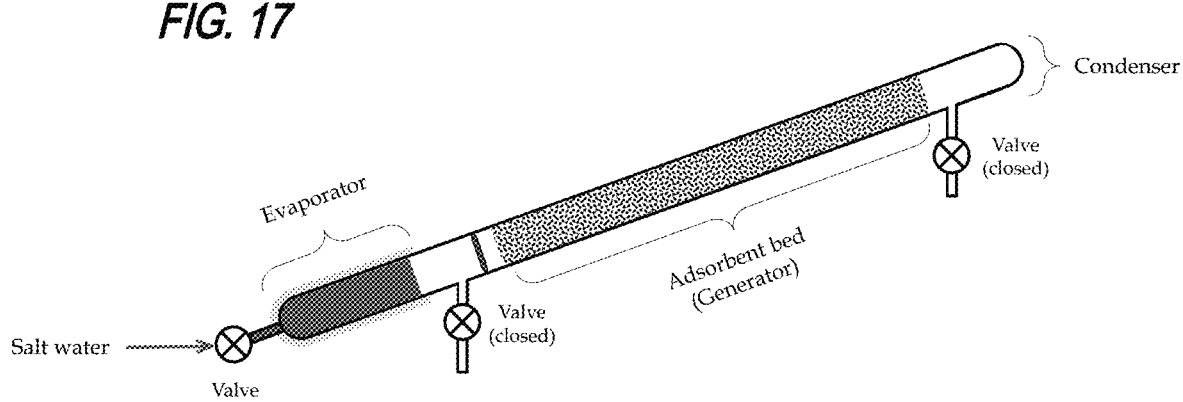
FIG. 17 depicts a schematic diagram of another evacuated tube adsorption heat pump and desalination module in an adsorption process for cooling generation.
Figure 18:
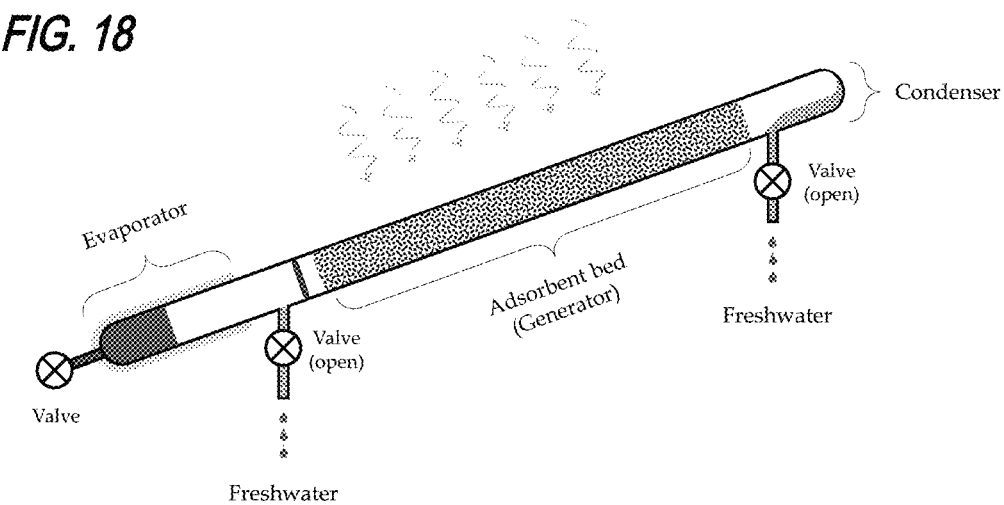
FIG. 18 depicts a schematic diagram of the evacuated tube adsorption heat pump and desalination module of FIG. 17 in a desorption process for water generation.

If one side of the tube is to be designated as an evaporator and the other side as a condenser, an additional valve or more are required to drain the freshwater condensed out of the tube during the desorption (water generation) process as shown in FIGS. 17-18. These valves can be connected together via another manifold or a tank in which to collect the fresh water. Note that the heat of condensation can be further utilized for heating purposes such as domestic hot water.

Figure 19:
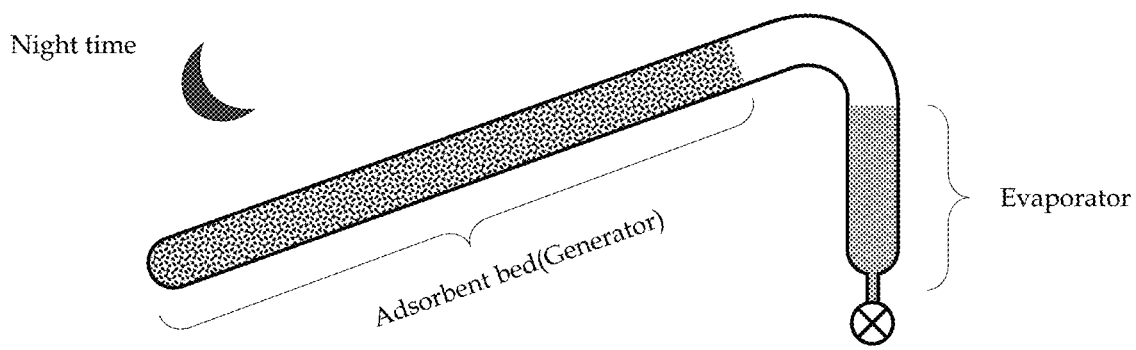
FIG. 19 depicts a schematic diagram of yet another evacuated tube adsorption heat pump and desalination module in an adsorption process for cooling generation.
Figure 20:
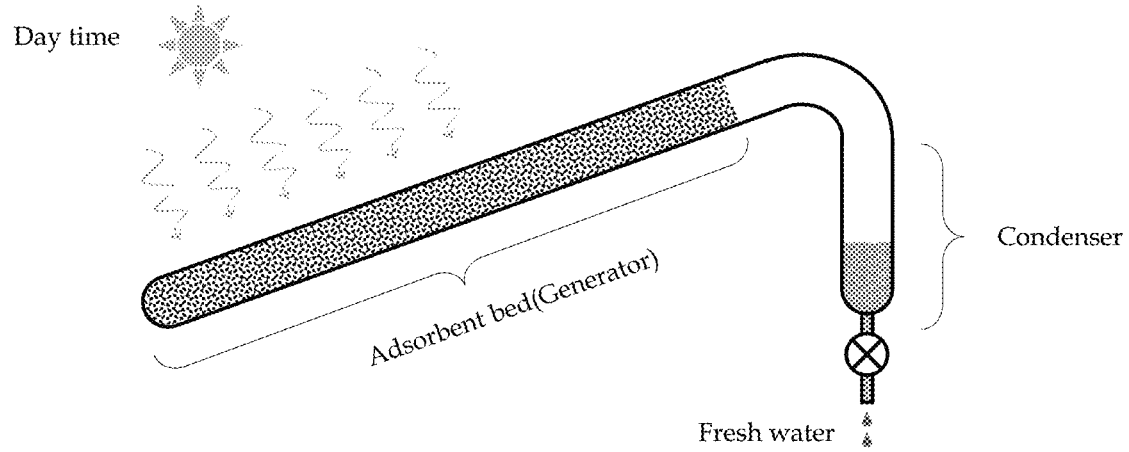
FIG. 20 depicts a schematic diagram of the evacuated tube adsorption heat pump and desalination module of FIG. 19 in a desorption process for water generation.

If the evacuated tube adsorption heat pump and desalination (ETAHP&D) module is to be implemented in areas where the module is to be placed horizontally, nearly horizontal, or for any other reasons, the tube may be bent and the condenser/evaporator part of the tube is kept vertical or nearly vertical as shown in FIGS. 19-20. The angle between the adsorbent bed section and condenser/evaporator section can possibly be designed so that the adsorbent bed part provides shading to the condenser/evaporator part and increases the system performance.

Since evacuating the ETAHP&D module is done on a regular basis, the vacuum is efficiently created. One approach is to fill the tube with steam (higher than ambient temperature), and then as the steam condenses the tube becomes evacuated. Another approach is to initially evacuate the tube using a vacuum pump after adding the salt water. After that, the tube exposed to an energy source in which evaporating starts taking place at temperature higher than ambient temperature. The tube is then further evacuated using a vacuum pump for a second time, before ceasing the heat source, to start the adsorption process.

Multiple evacuated tube adsorption heat pump (ETAHP&D) modules are to be connected in series to form an array as shown in FIGS. 22A-22D. Multiple ETAHP&D arrays can be connected in series or parallel to handle to cooling or water loads.

The ETAHP&D system (multiple arrays connected in parallel and series) can be operated intermittently and continuously. In the intermittent operation, the ETAHP&D system is regenerated and produces fresh water during a time when energy is available (e.g. during the day), and the ETAHP&D system generates cooling during another time (e.g. during the night). In this case, a thermal cooling storage tank (ice, phase change material, etc.) is required in order to use the generated cooling some other time (e.g. the next day). A continuous operation scheme is achievable by operating different arrays out of phase via ceasing the energy source to some arrays while other arrays receive energy. In the case of using solar energy as the energy source, this can be done, for example, by installing some arrays facing east in which the desorption process takes place early in the morning and by noon they will be totally shaded to start the adsorption process (producing cooling). In opposition, arrays that face west provide cooling in the morning and desorb (regeneration) afternoon. Intermittent operation may have the advantage of increasing the system overall efficiency of the cooling and water generations over the continuous operation as the ambient temperature is lower during the night and higher during the day.

During the desorption process when the condenser/evaporator acts as a condenser, heat rejection by the entire (ETAHP&D) array can be capitalized to provide domestic hot water in which the manifold is switched to circulate the hot water loop. Similarly, during the adsorption process (the condenser/evaporator acts as an evaporator) the same manifold is connected to the cooling storage. Such a configuration is attractive especially for intermittent operation.

The initial experiment was conducted on an actual evacuated tube solar adsorption heat pump and distillation (ETAHP&D) module. During the adsorption process, the evaporator was completely insulated to measure the minimum achievable temperature with no heat exchange (i.e., zero cooling load). The results of the initial experiment for both the adsorption and desorption processes of the evacuated tube adsorption module are shown in FIG. 9. Three thermocouples were placed on the outer wall of the tube with two at the adsorbent bed (one at the top and the other at the bottom), and the third thermocouple was placed on the outer tube wall of the condenser evaporator.

If double walled (twin wall) tube is to be used (as it has been mass produced due to its reliability with evacuated tube solar collectors), an additional heat exchanger for the adsorbent bed might be required as shown in FIG. 10. This alternative design may capitalize existing evacuated tube solar collectors with an existing selective absorber to be used as evacuated tube solar adsorption heat pump and distillation (ETAHP&D) modules.

For reasons of completeness, various aspects of the invention are set out in the following numbered clauses:

Clause 1: A system comprising:
an evacuated tube solar adsorption heat pump (ETSAHP) module, the ETSAHP module comprising:
  a transparent or semi-transparent tube configured to receive heat input from solar energy, the tube having a hollow interior, a top section, and a bottom section opposite the top section;
  an adsorbent bed comprising a plurality of adsorbent beads and positioned at the top section of the tube and configured to absorb solar energy;
  an adsorbent bed cage configured to contain the adsorbent bed at the top section of the tube;
  a threshold configured to stabilize the adsorbent container within the tube; and
  a condenser/evaporator positioned at the bottom section of the tube and spaced apart from the adsorbent bed.

Clause 2: The system of claim 1, wherein the ETSAHP module further comprises a selective absorber located on or within a wall of the tube, or on an outer wall of the adsorbent bed cage.

Clause 3: The system of claim 1, wherein the adsorbent bed cage is a closed cage with a mesh wall configured to contain a plurality of adsorbent beads and further configured to allow a refrigerant vapor to enter and exit the adsorbent bed cage.

Clause 4: The system of claim 1, wherein the adsorbent bed cage is a filter mesh disc positioned perpendicular to the tube length to hold the plurality of adsorbent beads within the top section of the tube.

Clause 5: The system of claim 1, wherein the ETSAHP module further comprises a valve positioned within the tube between the top and bottom sections of the tube and between the adsorbent bed and the condenser/evaporator.

Clause 6: The system of claim 5, wherein the valve is configured to be actuated between an open position and a closed position, and wherein the valve is activated magnetically, thermally, electrically, or manually.

Clause 7: The system of claim 1, further comprising a heat exchanger positioned at the bottom section of the tube and configured to transfer heat between the condenser/evaporator and an external cooling/heating load.

Clause 8: The system of claim 1, further comprising an insulating component located at the bottom section and configured to limit heat transfer between the condenser/evaporator and surroundings of the system.

Clause 9: The system of claim 1, wherein the tube is a first tube, the ETSAHP module comprising a second tube positioned around the first tube to define a vacuum space therebetween, wherein the vacuum space between the first and second tubes insulates the condenser/evaporator from a surroundings of the system.

Clause 10: The system of claim 1, further comprising a cap or stopper configured to selectively provide access to the hollow interior of the tube, and a one-way adaptor configured to permit airflow out of the tube and prevent airflow into the tube.

Clause 11: The system of claim 1, wherein the tube is sealed and closed such that components within the hollow interior of the tube are inaccessible.

Clause 12: The system of claim 1, wherein the transparent or semi-transparent tube is a glass tube.

Clause 13: The system of claim 1, wherein the ETSAHP module is a first ETSAHP module of a plurality of ETSAHP modules, and wherein the plurality of ETSAHP modules is connected in series forming an array.

Clause 14: The system of claim 13, wherein the plurality of ETSAHP modules is connected in series and in parallel.

Clause 15: The system of claim 14, wherein the plurality of ETSAHP modules are connected to a manifold.

Clause 16: A system having an evacuated tube adsorption heat pump and desalination (ETAHP&D) module, the module comprising:
a tube configured to receive heat input, the tube having a hollow interior;
an adsorbent located within the tube;
an adsorbent bed cage located within the tube and defining a storage volume containing the adsorbent;
a threshold configured to stabilize the adsorbent bed cage within the tube; and
a condenser/evaporator positioned within the interior of the tube and spaced apart from the adsorbent bed cage.

Clause 17: The system of claim 16, wherein the adsorbent bed cage is a closed cage with fluid-permeable mesh wall.

Clause 18: The system of claim 16, wherein the adsorbent bed cage is a filter mesh disc placed perpendicular to a tube length to separate the adsorbent beads from the condenser/evaporator.

Clause 19: The system of claim 16, wherein the valve or separator is activated magnetically, thermally, electrically, or manually.

Clause 20: The system of claim 16, further comprising a heat exchanger positioned adjacent to the condenser/evaporator and configured to enhance heat transfer between the condenser/evaporator and an external cooling or heating load.

Clause 21: The system of claim 16, further comprising an insulation at least partially surrounding the condenser/evaporator.

Clause 22: The system of claim 16, wherein the tube is a first tube, the system further comprising a second tube positioned around the first tube, and a vacuum space between the first tube and the second tube.

Clause 23: The system of claim 16, further comprising a cap configured to selectively provide access to the hollow interior of the tube and a one-way adapter configured to permit airflow out of the tube and prevent airflow into the tube.

Clause 24: The system of claim 16, wherein the tube is sealed and closed such that components within the hollow interior are inaccessible.

Clause 25: The system of claim 16, wherein the ETAHP&D module is a first ETAHP&D module of a plurality of ETAHP&D modules, and wherein the plurality of ETAHP&D modules is connected in series forming an array.

Clause 26: The system of claim 25, wherein the plurality of ETAHP&D modules is connected in series and in parallel.

Clause 27: The system of claim 25, wherein the plurality of ETAHP&D modules are connected to one manifold.

Clause 28: The system of claim 16, wherein the condenser/evaporator is made of one or more of copper, stainless steel, and Polyvinyl chloride.

Clause 29: The system of claim 16, wherein the selective absorber is placed on one of a wall of the tube, or on an outer wall of the adsorbent bed cage.

Clause 30: The system of claim 16, further comprising a selective absorber to absorb solar energy at the adsorbent bed.

Clause 31: The system of claim 16, further comprising a valve operable to transition between a first position in which the tube is sealed and a second position in which water can be added and/or removed from the tube through the valve.

Clause 32: A system comprising:
a manifold; and
a plurality of evacuated tube adsorption heat pump and desalination (ETAHP&D) modules, each ETAHP&D module comprising:
a tube configured to receive energy from an energy source;
an adsorbent located within the tube;
an adsorbent bed cage located within the tube and defining a storage volume containing the adsorbent;
a threshold configured to stabilize the adsorbent bed cage;
a condenser/evaporator positioned within the interior of the tube and spaced apart from the adsorbent bed cage;
an insulation at least partially surrounding the condenser/evaporator;
a removable cap fastened to the tube;
a selective absorber configured to absorb solar energy at the adsorbent bed; and
a connector operable to fasten the tube to the manifold.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. Various features and advantages of the invention are set forth in the following claims.

What is claimed is:

1. A system comprising:
a manifold; and
a plurality of evacuated tube adsorption heat pump and desalination (ETAHP&D) modules, each ETAHP&D module comprising:
a tube configured to receive energy from an energy source;
an adsorbent located within the tube;
an adsorbent bed cage located within the tube and defining a storage volume containing the adsorbent;
a threshold configured to stabilize the adsorbent bed cage;
a condenser/evaporator positioned within the interior of the tube and spaced apart from the adsorbent bed cage;
an insulation at least partially surrounding the condenser/evaporator;
a removable cap fastened to the tube;
a selective absorber configured to absorb solar energy at the adsorbent bed;
a connector operable to fasten the tube to the manifold; and
a heat exchanger positioned adjacent to the condenser/evaporator and configured to enhance heat transfer between the condenser/evaporator and an external cooling or heating load.

2. The system of claim 1, wherein the adsorbent bed cage is a closed cage with fluid-permeable mesh wall.

3. The system of claim 1, wherein the adsorbent bed cage is a filter mesh disc placed perpendicular to a tube length to separate the adsorbent beads from the condenser/evaporator.

4. The system of claim 1, wherein the tube is a first tube, the system further comprising a second tube positioned around the first tube, and a vacuum space between the first tube and the second tube.

5. The system of claim 1, wherein the tube is a transparent or semi-transparent tube configured to receive heat input from solar energy, the tube having a hollow interior, a top section, and a bottom section opposite the top section.

6. The system of claim 5, wherein the adsorbent bed is positioned at the top section of the tube and configured to absorb solar energy.

7. The system of claim 6, wherein the condenser/evaporator is positioned at the bottom section of the tube.

8. The system of claim 5, wherein the ETAHP&D module further comprises a valve positioned within the tube between the top and bottom sections of the tube.

9. The system of claim 8, wherein the valve is configured to be actuated between an open position and a closed position, and wherein the valve is activated magnetically, thermally, electrically, or manually.

10. The system of claim 1, wherein the ETAHP&D module further comprises a valve positioned between the adsorbent bed and the condenser/evaporator.

11. The system of claim 10, wherein the valve is configured to be actuated between an open position and a closed position, and wherein the valve is activated magnetically, thermally, electrically, or manually.

12. The system of claim 1, further comprising a one-way adaptor configured to permit airflow out of the tube and prevent airflow into the tube.

13. The system of claim 1, wherein the tube is a glass tube.

14. The system of claim 1, wherein the plurality of ETAHP&D modules is connected in series forming an array.

15. The system of claim 14, wherein the plurality of ETAHP&D modules is connected in series and in parallel.

* * * * *